(12) United States Patent
Lambert et al.

(10) Patent No.: US 10,523,624 B2
(45) Date of Patent: Dec. 31, 2019

(54) MANAGING DIGITAL MESSAGES ACROSS A PLURALITY OF SOCIAL NETWORKING GROUPS

(71) Applicant: Facebook, Inc., Menlo Park, CA (US)

(72) Inventors: Rachel Kay Lambert, San Francisco, CA (US); Raghavendar Chandrasekaran, Sunnyvale, CA (US); Areeb Muhammad Malik, San Francisco, CA (US); Meagan Anne Ryan, Orlando, FL (US); Zhi Min Seetoh, San Francisco, CA (US); Valerie Lauren Ross, San Francisco, CA (US); Wen-Chien Chen, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 419 days.

(21) Appl. No.: 15/348,179

(22) Filed: Nov. 10, 2016

(65) Prior Publication Data

US 2018/0131660 A1 May 10, 2018

(51) Int. Cl.
*G06F 15/16* (2006.01)
*H04L 12/58* (2006.01)

(52) U.S. Cl.
CPC .................... *H04L 51/32* (2013.01)

(58) Field of Classification Search
CPC .............................. H04L 51/32; G06Q 10/107
USPC ........................................................ 709/206
See application file for complete search history.

(56) References Cited

U.S. PATENT DOCUMENTS

| 8,560,954 | B1* | 10/2013 | Nakajima | G06Q 10/10 715/753 |
| 8,655,404 | B1* | 2/2014 | Singh | G06Q 50/01 455/556.1 |
| 8,688,782 | B1* | 4/2014 | Lin | G06Q 30/02 709/203 |
| 8,769,012 | B1* | 7/2014 | Shah | G06Q 10/101 709/204 |
| 8,924,465 | B1* | 12/2014 | Tunguz-Zawislak | H04N 21/00 709/203 |
| 9,298,763 | B1* | 3/2016 | Zack | G06F 16/337 |
| 9,374,399 | B1* | 6/2016 | Lin | G06Q 30/02 |
| 9,665,584 | B2* | 5/2017 | Jayaram | H04L 67/306 |
| 9,998,881 | B2* | 6/2018 | Hosier, Jr. | H04W 4/08 |
| 10,021,059 | B1* | 7/2018 | Rao | H04L 51/32 |
| 2008/0215589 | A1* | 9/2008 | Elhaik | G06F 16/957 |

(Continued)

*Primary Examiner* — Anthony Mejia
(74) *Attorney, Agent, or Firm* — Keller Jolley Preece

(57) ABSTRACT

One or more embodiments of the disclosure include a digital multi-group messaging system that manages digital messages across a plurality of social networking groups. In particular, in one or more embodiments, the digital multi-group messaging system detects a digital message and selects a set of social networking groups to suggest to the user. Upon user selection of suggested social networking groups, the digital multi-group messaging system can post the digital message to the selected social networking groups. Moreover, the digital multi-group messaging system can monitor user interaction with the posted digital message in relation to the selected social networking groups and present member interest information to a user, enabling the user to review and manage the digital message across social networking groups.

20 Claims, 18 Drawing Sheets

(56) References Cited

U.S. PATENT DOCUMENTS

| | | | | |
|---|---|---|---|---|
| 2011/0010182 A1* | 1/2011 | Turski | ................. | G06Q 10/107 705/1.1 |
| 2011/0320373 A1* | 12/2011 | Lee | ....................... | G06Q 50/01 705/319 |
| 2012/0197980 A1* | 8/2012 | Terleski | ................. | G06Q 50/01 709/203 |
| 2012/0197984 A1* | 8/2012 | Rao | ..................... | G06Q 10/107 709/203 |
| 2013/0282839 A1* | 10/2013 | Alcala | ............... | H04N 21/4788 709/206 |
| 2014/0006523 A1* | 1/2014 | Hofman | ................. | G06Q 10/10 709/206 |
| 2014/0067943 A1* | 3/2014 | Jackson | ............ | G06Q 30/0269 709/204 |
| 2014/0067944 A1* | 3/2014 | Jackson | ................ | G06Q 50/01 709/204 |
| 2014/0096200 A1* | 4/2014 | Brown | ............... | G06F 21/6263 726/4 |
| 2014/0108562 A1* | 4/2014 | Panzer | .................. | G06Q 10/10 709/206 |
| 2014/0304338 A1* | 10/2014 | Lee | ....................... | H04L 67/22 709/205 |
| 2017/0093787 A1* | 3/2017 | Harihara Iyer | ......... | H04L 51/12 |
| 2017/0289288 A1* | 10/2017 | Marra | ................. | G06F 16/9535 |
| 2017/0351675 A1* | 12/2017 | Marra | .................... | G06N 20/00 |
| 2017/0351961 A1* | 12/2017 | Kochura | ................ | G06Q 50/01 |
| 2018/0131660 A1* | 5/2018 | Lambert | ................ | H04L 51/32 |

* cited by examiner

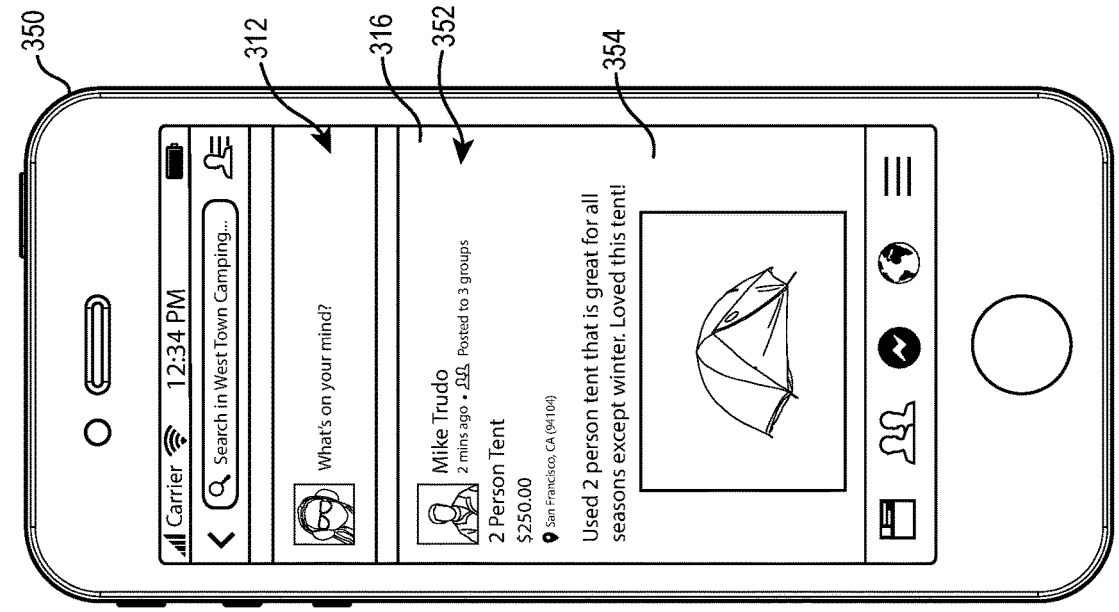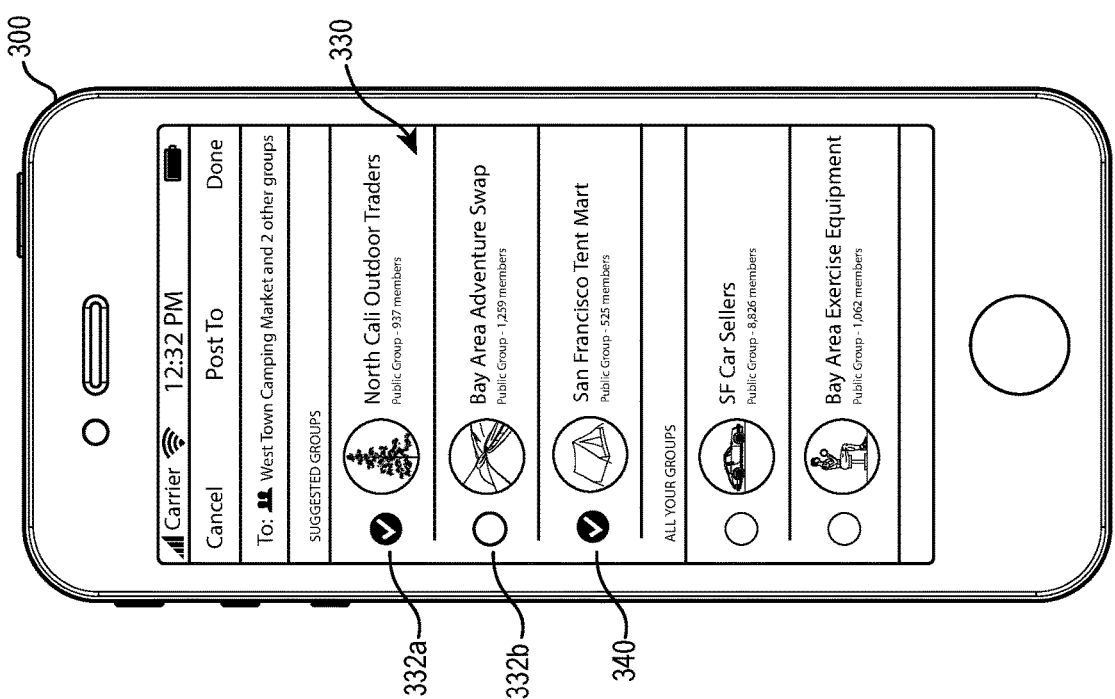

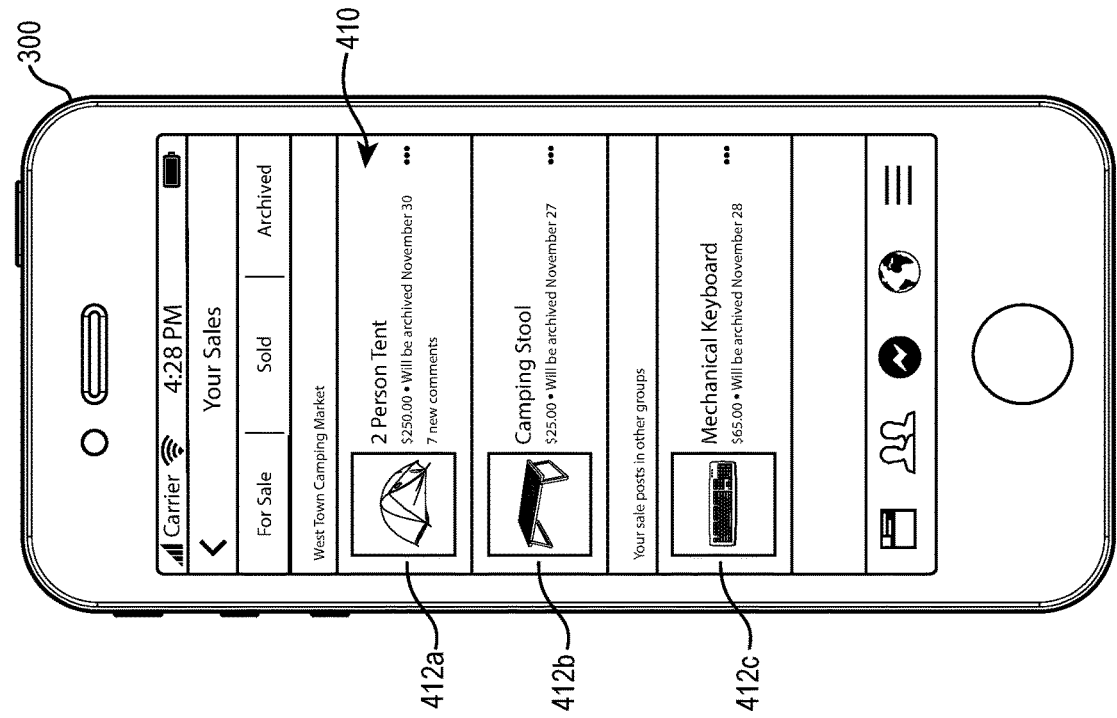
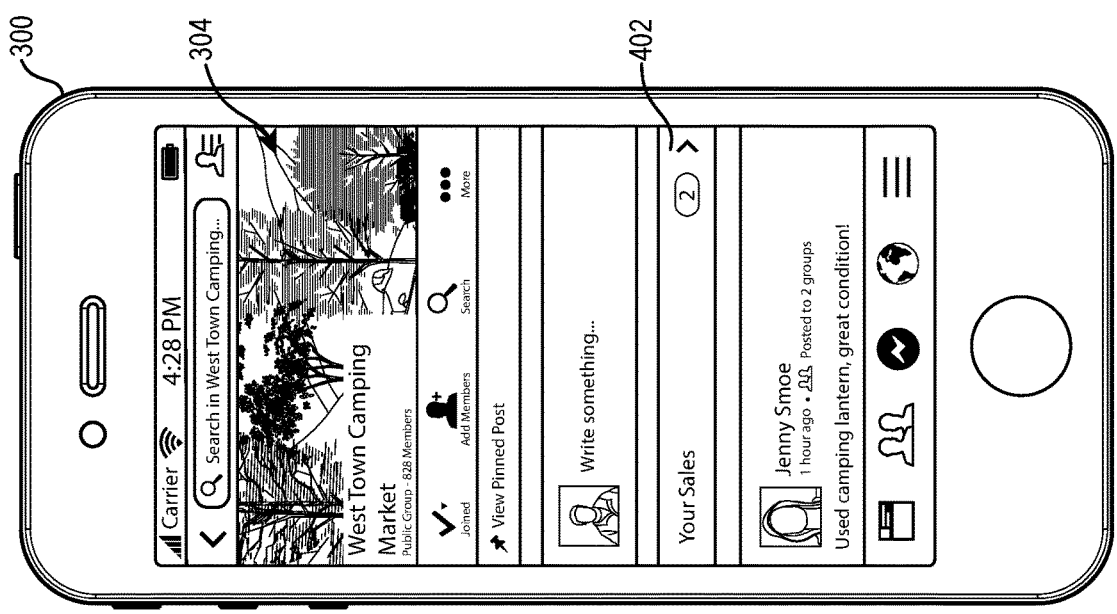
Fig. 4B
Fig. 4A

MANAGING DIGITAL MESSAGES ACROSS A PLURALITY OF SOCIAL NETWORKING GROUPS

BACKGROUND

Recent years have seen rapid development in digital systems that enable individuals to digitally communicate and connect with others. Indeed, as a result of proliferation in smartphones, tablets, laptops, computers, smart watches, smart televisions, and other computing devices, individuals have increased access to devices capable of sending and receiving information in relation to other individual users. Accordingly, developers have generated a variety of digital applications that allow clients to utilize computing devices to participate in various forms of digital communication.

For example, some conventional digital communication systems allow users to share digital messages with other groups of individual users. Such conventional digital communication systems, however, have a number of shortcomings. For example, in order to share a digital message with multiple groups of individual users, conventional digital systems often require a user to search for pertinent user groups and then create and manage multiple digital messages for each group. Users often express frustration with the amount of time and effort wasted in identifying pertinent groups and otherwise generating, responding to, and managing multiple digital messages corresponding to multiple identified groups. Furthermore, such conventional communication digital systems often place significant burdens on operating computing devices in that they often impose duplicated, wasteful storage and processing requirements in generating and managing duplicative messages.

These and other problems exist with regard to conventional digital information systems for communicating and sharing digital messages with other users.

SUMMARY

One or more embodiments described below provide benefits and/or solve one or more of the foregoing or other problems in the art with systems and methods for managing digital messages across social networking groups. In particular, in one or more embodiments, the disclosed systems and methods manage a plurality of social networking groups and suggest social networking groups to users drafting digital messages. In response to user selection of multiple social networking groups (e.g., the suggested social networking groups), the disclosed systems and methods can automatically post digital messages to the selected social networking groups and monitor the posts for the user. To illustrate, the disclosed systems and methods can gather member interest information from multiple social networking groups and provide the member interest information in a single user interface. In this manner, the disclosed systems and methods enable users to easily and conveniently share and manage digital messages among multiple social networking groups.

For example, in one or more embodiments, the disclosed systems and methods manage a plurality of social networking groups via a social networking system. For instance, each social networking group of the plurality of social networking groups comprise a plurality of members that are users of the social networking system that have joined the social networking group. Moreover, in response to detecting a digital message from a user to a first social networking group, the disclosed systems and methods suggest to the user, based on one or more characteristics of the first social networking group, a subset of social networking groups of the plurality of social networking groups for posting the digital message.

Furthermore, based on receiving a selection, by the user, of at least one social networking group of the suggested subset of social networking groups, the systems and methods post the digital message to the first social networking group and the at least one social networking group. In addition, the disclosed systems and methods provide to the user within a user interface member interest information corresponding to the digital message from members of the first social networking group together with member interest information corresponding to the digital message from members of the at least one social networking group.

By suggesting social networking groups (e.g., based on group characteristics of a first social networking group, digital message content, or other factors), the systems and methods allow users to easily and quickly identify pertinent social networking groups for posting digital messages. Moreover, by providing member interest information regarding a digital message posted in multiple social networking groups together via a user interface, the disclosed systems and methods can significantly reduce the time and burden associated with a user managing digital messages.

In addition, the disclosed systems and methods can further improve efficiency of various computing devices utilized to manage digital messages across social networking groups. Indeed, the disclosed systems and methods can store a digital message and post the digital message in multiple social networking group pages by reference to the stored digital message. In this manner, the disclosed systems and methods can reduce duplicative, unnecessary storage and processing of multiple copies of a digital message.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

FIGS. 3A-3F illustrate a computing device and example graphical user interfaces for suggesting social networking groups and posting digital messages to a plurality of social networking groups in accordance with one or more embodiments;

FIGS. 4A-4E illustrates a computing device and example graphical user interfaces for managing social networking groups in accordance with one or more embodiments;

DETAILED DESCRIPTION

Figure 1A:
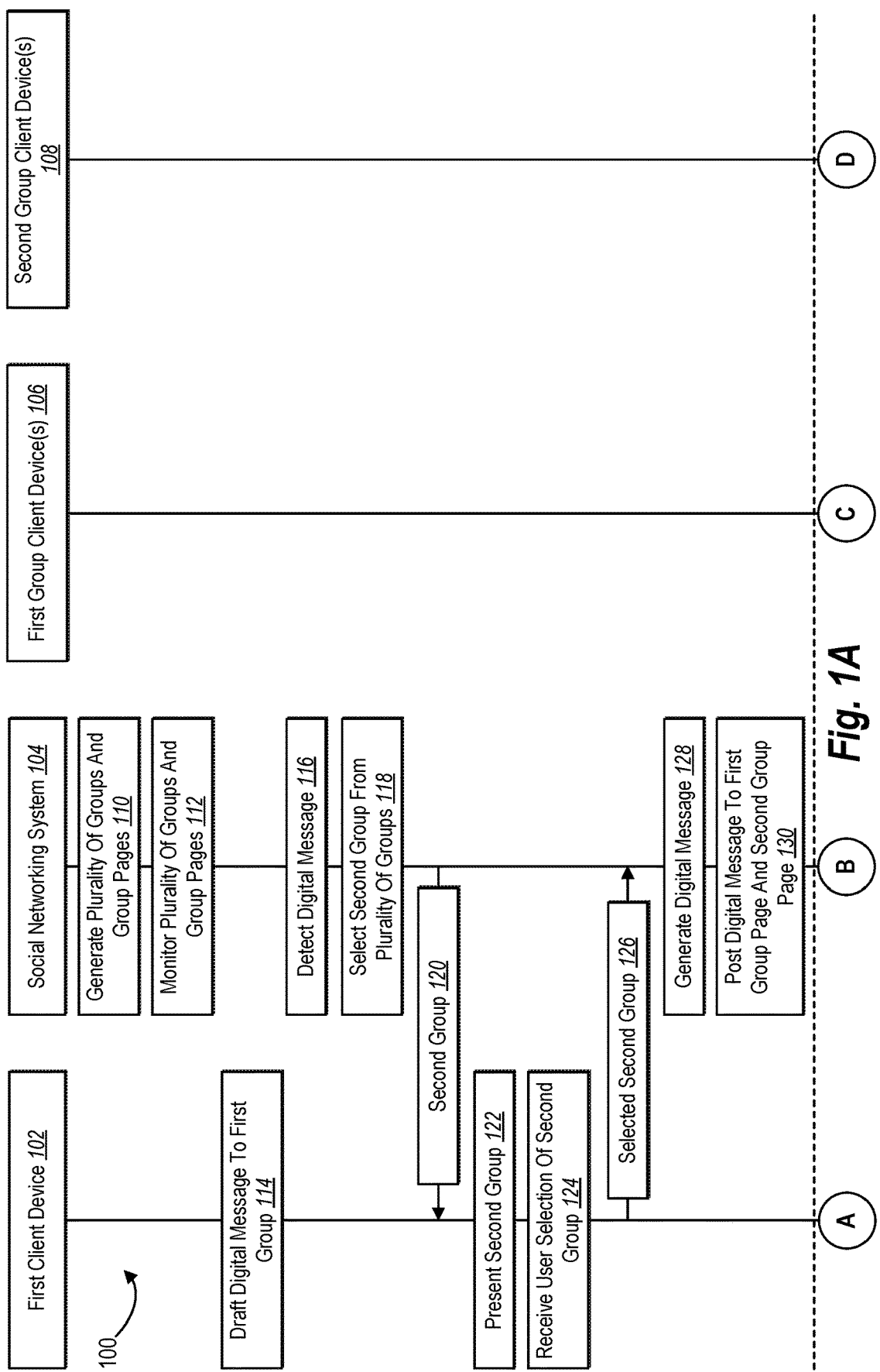
FIGS. 1A-1D illustrate a sequence diagram of a plurality of steps in a method of managing a digital message across social networking groups in accordance with one or more embodiments.

One or more embodiments of the present invention include a digital multi-group messaging system that manages digital messages across a plurality of social networking groups. In particular, in one or more embodiments, the digital multi-group messaging system detects a digital message from a user and selects a subset of social networking groups to suggest to the user. Moreover, based on user selection of multiple social networking groups (e.g., from the suggested groups), the digital multi-group messaging system can post the digital message to the multiple social networking groups. Furthermore, in one or more embodiments, the digital multi-group messaging system also monitors user interaction with the digital message across the multiple social networking groups and generates member interest information corresponding to the digital message. The digital multi-group messaging system provides the member interest information corresponding to the digital message from the multiple social networking groups to the user. For instance, the digital multi-group messaging system provides member interest information from multiple groups together within a user interface.

For example, in one or more embodiments, the digital multi-group messaging system manages a plurality of social networking groups via a social networking system. Each social networking group of the plurality of social networking groups includes a plurality of members that are users of the social networking system that have joined the social networking group. Moreover, in response to detecting a digital message comprising digital message content from a user, the digital multi-group messaging system can suggest, to the user, a subset of social networking groups of the plurality of social networking groups to which to post the digital message.

Further, based on receiving a user selection of multiple social networking groups from the suggested subset of social networking groups, the digital multi-group messaging system can post the digital message to the selected multiple social networking groups. In addition, the digital multi-group messaging system can provide, to the user, within a single display area of a user interface, member interest information corresponding to the posted digital message. In particular, the digital multi-group messaging system can receive member interest information from members of each of the multiple social networking groups. Moreover, the digital multi-group messaging system can provide the member interest information from each of the multiple social networking groups together within a single graphical user interface.

The digital multi-group messaging system provides a variety of advantages over existing systems. For instance, by suggesting social networking groups (e.g., based on digital message content, previously selected social networking groups, user information, or other factors), the digital multi-group messaging system can allow users to easily and conveniently identify pertinent social networking groups to which to post digital messages. Accordingly, users can avoid the frustrating and time consuming process of searching for and identifying social networking users or groups that may correspond to a particular digital message (e.g., users or groups are likely to have an interest in the content of the digital message).

In addition, by posting a digital message to a variety of social networking groups, and collecting member interest information corresponding to the digital message from the variety of social networking groups, the digital multi-group messaging system can further reduce the time and frustration associated with managing a plurality of digital message posts to a variety of groups. For example, the digital multi-group messaging system can allow users to reduce the time required to view comments from multiple different social networking groups, reply to comments from multiple different social networking groups, or revise digital messages posted to multiple different social networking groups.

Furthermore, as mentioned above, the digital multi-group messaging system also improves the function of computing devices utilized to implement the digital multi-group messaging system. For example, in one or more embodiments, the digital multi-group messaging system receives a single digital message and utilizes the digital message for a variety of posts in a variety of different social networking groups. More particularly, the digital multi-group messaging system can create multiple posts that link to (or otherwise reference) a single digital message. Accordingly, the digital multi-group messaging system can reduce the burden in memory and computer processing requirements associated with storing and accessing a plurality of digital messages for different posts to different individuals or groups.

As mentioned previously, in one or more embodiments, the digital multi-group messaging system can select one or more social networking groups to suggest to a user. In particular, in one or more embodiments, the digital multi-group messaging system generates and manages a plurality of social networking groups and analyzes the plurality of social networking groups to select one or more social networking groups. Moreover, the digital multi-group messaging system can then suggest the selected social networking groups to a user via a variety of notifications, suggestion areas, or other user interface elements.

The digital multi-group messaging system can select a social networking group to suggest to a user based on a variety of factors. For example, the digital multi-group messaging system can select a social networking group based on digital message content (e.g., a digital image, person, activity, text, and/or product within content of the digital message). To illustrate, the digital multi-group messaging system can determine that a digital message includes an event. The digital multi-group messaging system can identify a social networking group corresponding to the event, and in response, suggest the social networking group to the user.

In addition to selecting a social networking group to suggest based on digital messaging content, the digital multi-group messaging system can select a social networking group based on a variety of additional factors. For example, in one or more embodiments, the digital multi-group messaging system selects a social networking system based on group similarity, user information, or group activity level. Thus, as discussed in greater detail below, the digital multi-group messaging system can select social networking groups based on a category associated with a social networking group, content of posts and/or comments in a social networking group, a number of posts within a social networking group, a number of comments within a social networking group, a number of members within a social networking group, information regarding members in a social networking group, a number of sales posts (or non-sales posts) in a social networking group, a number of sales within a social networking group, or a measure of group health.

As mentioned above, the digital multi-group messaging system can also post a digital message to social networking groups and monitor user interaction with the digital message across the social networking groups. For example, based on receiving a user selection of the social networking groups, the digital multi-group messaging system can automatically post a digital message to each of the social networking groups. Moreover, the digital multi-group messaging system can monitor user interactions with the digital message to determine member interest information from the social networking groups. For example, the digital multi-group messaging system can monitor user actions to determine member interest information comprising comments, views, selections, or reactions (e.g., "likes").

The digital multi-group messaging system can also gather, report, and display member interest information. For example, in one or more embodiments, the digital multi-group messaging system provides a user interface to a user that simultaneously presents member interest information from a variety of social networking groups corresponding to a digital message. To illustrate, the digital multi-group messaging system can gather comments regarding a digital message from various social networking groups and present the comments together to a user via a single display area within a user interface. The digital multi-group messaging system can also enable the user to review and respond to comments from the various social networking groups from the user interface.

In addition to enabling the user to review and respond to comments from the various social networking groups, the digital multi-group messaging system can modify digital messages in relation to multiple social networking groups. For example, the digital multi-group messaging system can receive user input of revisions to a digital message, and, in response, automatically update posts in multiple social networking groups to reflect the modifications to the digital message. In this manner, the digital multi-group messaging system allows users to quickly and easily manage a digital message posted to a plurality of social networking groups.

In one or more embodiments, the digital multi-group messaging system also provides unique solutions in relation to private social networking groups. In particular, in one or more embodiments, the digital multi-group messaging system generates and manages private social networking groups that only allow users to post digital messages after a user is accepted into the social networking group. For example, in one or more embodiments, the digital multi-group messaging system generates and manages private social networking groups that require users to obtain permission (e.g., from an administer) to join the social networking group. In such embodiments, the digital multi-group messaging system includes solutions that enable users to quickly and efficiently post digital messages to private social networking groups.

For example, in one or more embodiments, the digital multi-group messaging system analyzes a user profile to generate a reliability score corresponding to a user that seeks to post in a private social networking group. Moreover, the digital multi-group messaging system can utilize the reliability score to determine whether to allow a user to post the digital message in a private social networking group (e.g., without administrator approval, with streamlined administrator approval, or after-the-fact administrator approval). Similarly, in one or more embodiments, the digital multi-group messaging system generates a designated portion of a social networking feed within a social networking page devoted to posts from users that are not members of a group (e.g., non-members with a particular reliability score).

As used herein, the term "social networking group" refers to a plurality of users of a social networking system with a common interest. In particular, the "term social networking group" includes a plurality of members that are users of a social networking system that have elected to share information with other members regarding a common interest. Moreover, a social networking group includes a plurality of members that have elected to obtain privileges in relation to a plurality of other members. For example, a social networking group includes a plurality of members that have elected to receive digital messages from a plurality of other members, post digital messages to a plurality of other members (i.e., via a social networking group page), comment on digital messages of other members (i.e., via a social networking group page), receive updates and/or notifications from a plurality of other members, access a social networking group page, and/or make changes to a social networking group page. To illustrate, a social networking group may include a plurality of members that have elected to share information regarding an interest, such as camping, sports, celebrities, products, services, or events.

In one or more embodiments, a social networking group corresponds to a social networking group page. A social networking group page includes a compilation of digital information (e.g., a web page) that is shared by members, and is accessible to members, of a social networking group. For example, a social networking group page can include a social networking feed that comprises posts from members of the social networking group or other information regarding the social networking group.

As used herein, the term "members" refers to users of a social networking system that have elected to join a social networking group. In particular, the term "members" includes individuals that have selected a user interface element operable to add the user to a list of users of a social networking system corresponding to a social networking group. Moreover, the term "members" also includes users of a social networking system that have obtained unique privileges in relation to a social networking group. For example, in one or more embodiments, members of a social networking group have obtained privileges to post to a social networking page, comment on digital messages in a social networking group, add other members, view private content on the social networking page, or contact other members (i.e., privileges not provided to non-members).

As used herein, the term "digital message" refers to a digital item capable of conveying information to a recipient. In particular, a "digital message" includes a digital item capable of conveying information from a user of a social networking system to another user of a social networking system. For example, a "digital message" includes a social networking post or other digital notification to a social networking group. In addition, and as used herein, the term "digital message content" refers to digital content within a digital message. In particular, the term digital message content includes digital text, digital images, and/or digital video within a digital message. For example, in relation to a social networking post for selling a product, the term digital message content includes a product mentioned in the digital message, a description of the product or product feature in the digital message, a location of the product referenced in the digital message, a picture of the product included in the digital message, and/or a price of the product in the digital message. As used herein, the term "product" refers to a good or service.

As used herein, the term "user interface" (or graphical user interface) refers to a visual interface provided via a display device. For example, a visual interface can include one or more digital graphical elements with which a user can interact to provide user input. In particular, the term "user interface" can include a visual interface within a window of a computer display that contains graphical elements and corresponds to a particular software application. Moreover, a user can interact with a user interface using various user input devices, such as a touchscreen, mouse, trackpad, keyboard, etc.

As used herein, the term "display area" refers to a region within a graphical user interface. In particular, a "display area" includes a region of a user interface corresponding to one or more graphical elements for displaying digital content. Specifically, a display area can include a region of a user interface to display, to a user, digital content from a plurality of social networking groups, as will be further described below.

As used herein, the term "member interest information" refers to digital information reflecting user interaction with a digital message. In particular, the term "member interest information" can represent a user interaction by a member of a social media group with a digital message (e.g., a post of the digital message). Moreover, the term member interest information can include user interactions reflecting one or more member's interest in a digital message. For example, the term member interest information includes a number of comments, views, selections, or reactions (e.g., "likes") by a member of a social networking group with a social networking post.

As used herein, the term "activity level" refers to a measure of user interaction. In particular, the term "activity level" includes a measure of user interaction within a social networking group (e.g., user interaction with a social networking page). For example, "activity level" can include a measure of posts, comments, views, reactions (e.g., "likes"), clicks, time, purchases, products for sale, products sold, or sales volume corresponding to a social networking group.

Turning now to FIGS. 1A-1D, additional detail will be provided regarding managing a digital message across multiple social networking groups in accordance with one or more embodiments. In particular, FIGS. 1A-1D illustrate a representation of a sequence of steps 110-174 performed by a digital multi-group messaging system 100 for managing digital messages across social networking groups. As an initial matter, for purposes of explanation, many embodiments disclosed herein describe the digital merchant content system 100 as including or being part of a social networking system. It should be understood, however, that the same or similar principles, functions, features, and methods described with respect to a social networking system can also be practiced within various other types of computer systems, and as such, various embodiments of the digital multi-group system 100 are not necessarily used in combination with a social networking system.

Nevertheless, FIGS. 1A-1D show the digital multi-group messaging system 100 can reside in part on a first client device 102, a social networking system 104, first group client device(s) 106, and second group client device(s) 108. In particular, as discussed in more detail below, the digital multi-group messaging system 100 can include computer-executable instructions that, when executed by the first client device 102, the social networking system 104, the first group client device(s) 106, and/or the second group client device(s) 108, cause the first client device 102, the social networking system 104, the first group client device(s) 106, and/or the second group client device(s) 108 to perform the steps 110-174 shown in the sequence diagram of FIGS. 1A-1D. The first client device 102, first group client device(s) 106, and/or the second group client device(s) 108 can include a computing device, such as a desktop, laptop, tablet, or mobile device such as a smartphone (e.g., a computing device described below in relation to FIG. 9). Moreover, the social networking system 104 can include a data server and/or a system that stores one or more social graphs with edges and nodes corresponding to users of a social networking system (as described in greater detail in relation to FIGS. 10-11).

The first group client device(s) 106 and the second group client device(s) 108 correspond to members of a first social networking group and members of a second social networking group, respectively. Specifically, the first group client device(s) 106 correspond to members that have elected to join a first social networking group. Similarly, the second group client device(s) 108 correspond to members that have elected to join a second social networking group. Although displayed separately, any individual client device can belong to both the first group client device(s) 106 and the second group client device(s) 108.

As illustrated in FIG. 1A, the digital multi-group messaging system 100 performs the act 110 of generating a plurality of social networking groups and social networking group pages. In particular, as mentioned briefly above, the digital multi-group messaging system 100 can generate and manage social networking groups that each include a plurality of members. For instance, the digital multi-group messaging system 100 can generate a social networking group based on requests from users of the social networking system to create and/or join social networking groups. To illustrate, a user of one or more of the first group client device(s) 106 can provide, to the social networking system 104, user input that includes, for example, a social networking group name and social networking group settings. In response, the social networking system 104 can generate a social networking group based on the social networking group name and the social networking group settings.

The social networking system 104 can also manage the social networking group by controlling membership of the social networking group. For example, the social networking system 104, can add a user of a social networking system to a social networking group, remove a member of a social networking group, or otherwise modify membership of a social networking group. Moreover, as illustrated, the social networking system 104 can also generate social networking group pages. To illustrate, the social networking system 104 can generate a social networking group page with a digital image reflecting the social networking group, a title of the social networking group page, or a description of the social networking group page (e.g., based on user input).

In addition, the social networking system 104 can manage a social networking feed corresponding to a social networking group page. For example, the social networking system 104 can receive digital messages from members of a social networking group and post the digital messages to the social networking page. Moreover, the social networking system 104 can provide digital messages posted on the social networking page to other members of the social networking group.

In addition to a social networking feed, the digital multi-group messaging system 100 can also provide a variety of additional digital communications between members of a social networking group. For example, the digital multi-group messaging system 100 can provide digital notifications, e-mails, text messages, instant messages, or other digital communications to or from members of a social networking group.

As shown in FIG. 1A, the digital multi-group messaging system 100 (via the social networking system 104) can also perform the act 112 of monitoring the plurality of social networking groups and social networking group pages. For example, the digital multi-group messaging system 100 can monitor user interactions of members with social networking groups (and social networking group pages) or other digital communications between members of social networking groups. To illustrate, the digital multi-group messaging system 100 can monitor clicks on posts in a social networking feed on a social networking group page, a number of members in a social networking group, content shared within a social networking group, or digital communications provided between members of the social networking group.

As shown in FIG. 1A, the digital multi-group messaging system 100 (e.g., via the first client device 102) can also perform the act 114 of drafting a digital message to a first social networking group. For example, the first client device 102 can draft a digital message including digital message content that includes digital images, digital videos, and/or digital text to send to the first social networking group.

Moreover, as illustrated in FIG. 1A, the digital multi-group messaging system 100 can also perform the act 116 of detecting the digital message. For example, the digital multi-group messaging system 100 can monitor user interaction with the first client device 102 and determine that the first client device 102 is creating a digital message to a first group. Similarly, in one or more embodiments, the digital multi-group messaging system 100 performs the act 116 by sending, from the first client device 102 an indication of the draft digital message to the social networking system 104. For example, an indication of a draft digital message can include a digital information that includes one or more portions of the draft digital message, such as an intended recipient (e.g., a user or a group), a title or subject heading, an image, text, or other digital message content.

As shown in FIG. 1A, upon detecting the digital message, the social networking system 104 can perform the act 118 of selecting a second social networking group from the plurality of social networking groups. In particular, the digital multi-group messaging system 100 can select a second social networking group from the plurality of social networking groups generated and/or monitored by the social networking system 104 at acts 110 and 112. To illustrate, the digital multi-group messaging system 100 can select a social networking group to suggest based on information monitored regarding the plurality of social networking systems (e.g., at the act 112).

In one or more embodiments, the digital multi-group messaging system 100 selects the second social networking group utilizing a ranking algorithm. In particular, the digital multi-group messaging system 100 can apply a ranking algorithm to the plurality of social networking groups managed by the social networking system and select the second social networking group based on the resulting ranking. As discussed in greater detail below, the ranking algorithm can consider a variety of factors in ranking and selecting the second social networking group. For example, the ranking algorithm can consider group similarity (e.g., similarity between the first social networking group and the second social networking group), digital message content, user information (e.g., user interests, location, or demographic information), or group activity level.

As shown in FIG. 1A, the digital multi-group messaging system 100 can also perform the acts 120, 122 of sending the second social networking group to the first client device 102 and presenting the second social networking group via the first client device 102. For example, in one or more embodiments, the digital multi-group messaging system 100 provides a list of suggested social networking groups for display, which can include the second social networking group.

Upon presenting the second social networking group, the first client device 102 can also perform the act 124 of receiving user selection of the second social networking group. Moreover, the first client device 102 can also perform the act 126 of sending the selected second group to the social networking system 104. In particular, the first client device 102 can send an indication corresponding to the user's selection of the second group to the social networking system 104.

As shown in FIG. 1A, upon receiving the selected second social networking group, the social networking system 104 can perform the acts 128, 130 of generating the digital message and posting the digital message to the first social networking group page and the second social networking group page. In particular, the social networking system 104 can generate and store the digital message (e.g., the digital message detected at the act 116). Moreover, based on the digital message, the digital multi-group messaging system can generate a post for a social networking feed corresponding to the first social networking group (i.e., on the first social networking group page) and generate a post for a social networking feed corresponding to the second social networking group (i.e., on the second social networking group page).

As discussed above, in one or more embodiments, the digital multi-group messaging system 100 stores the digital message and generates posts by linking the posts to all or part of the stored digital message. In this manner, the digital multi-group messaging system 100 can create and track separate posts without duplicating digital message content (i.e., generating a separate digital message for each post).

Figure 1B:
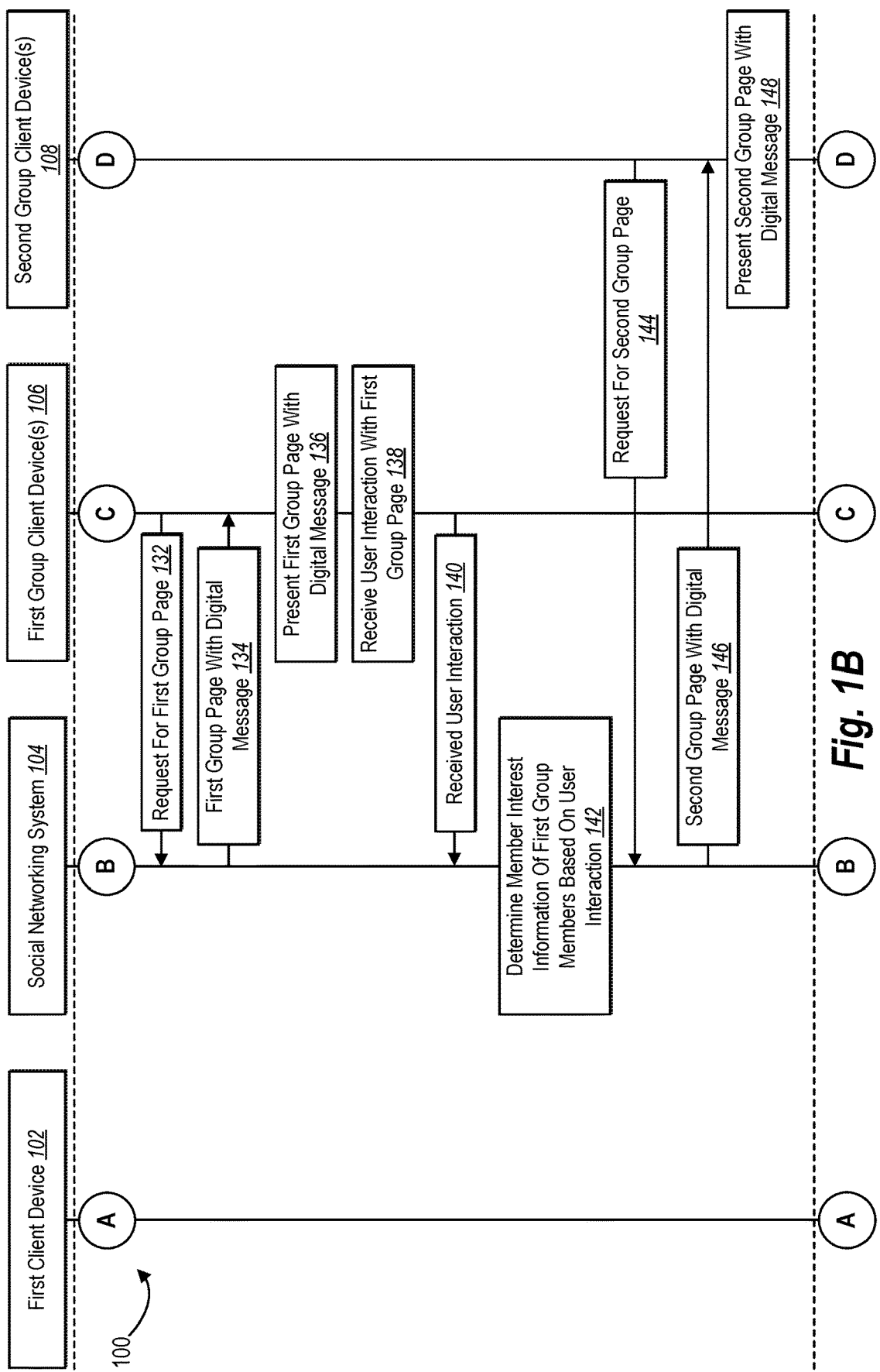

In relation to the acts 128, 130, the digital multi-group messaging system 100 can generate and post the digital message such that members of the first social networking group and the second social networking group can access the digital message (e.g., via the first social networking group page and the second social networking group page). For example, FIG. 1B illustrates that the first group client device(s) 106 can perform the act 132 of sending a request for the first social networking group page from the social networking system 104. In particular, the first group client device(s) 106 can send a request to view a first social networking group page corresponding to the first social networking group.

In response, the social networking system 104 performs the act 134 of providing the first group social networking page with the digital message to the first group client device(s) 106, as illustrated in FIG. 1B. For example, the social networking system 104 can provide the first social networking group page with a social networking feed that includes the digital message. Furthermore, as shown in FIG. 1B, the first group client device(s) 106 can perform the acts 136, 138 of presenting the first social networking group page with the digital message and receiving user interaction with the first social networking group page. To illustrate, the first group client device(s) 106 can receive user interaction indicating a user viewing, commenting on, or otherwise interacting with the digital message.

In response to receiving user interaction with the first social networking group page, the first group client device(s) 106 can also perform the act 140 of sending the received user interaction to the social networking system 104. Moreover, the social networking system 104 can perform the act 142 of determining member interest information of members of the first social networking group based on the received user interaction. For example, the social networking system 104 can receive a user interaction and determine that a user has commented on, reacted to, or viewed a digital message. In this manner, the social networking system 104 can gather member interest information corresponding to user interactions from the first group client device(s) 106.

Figure 1C:
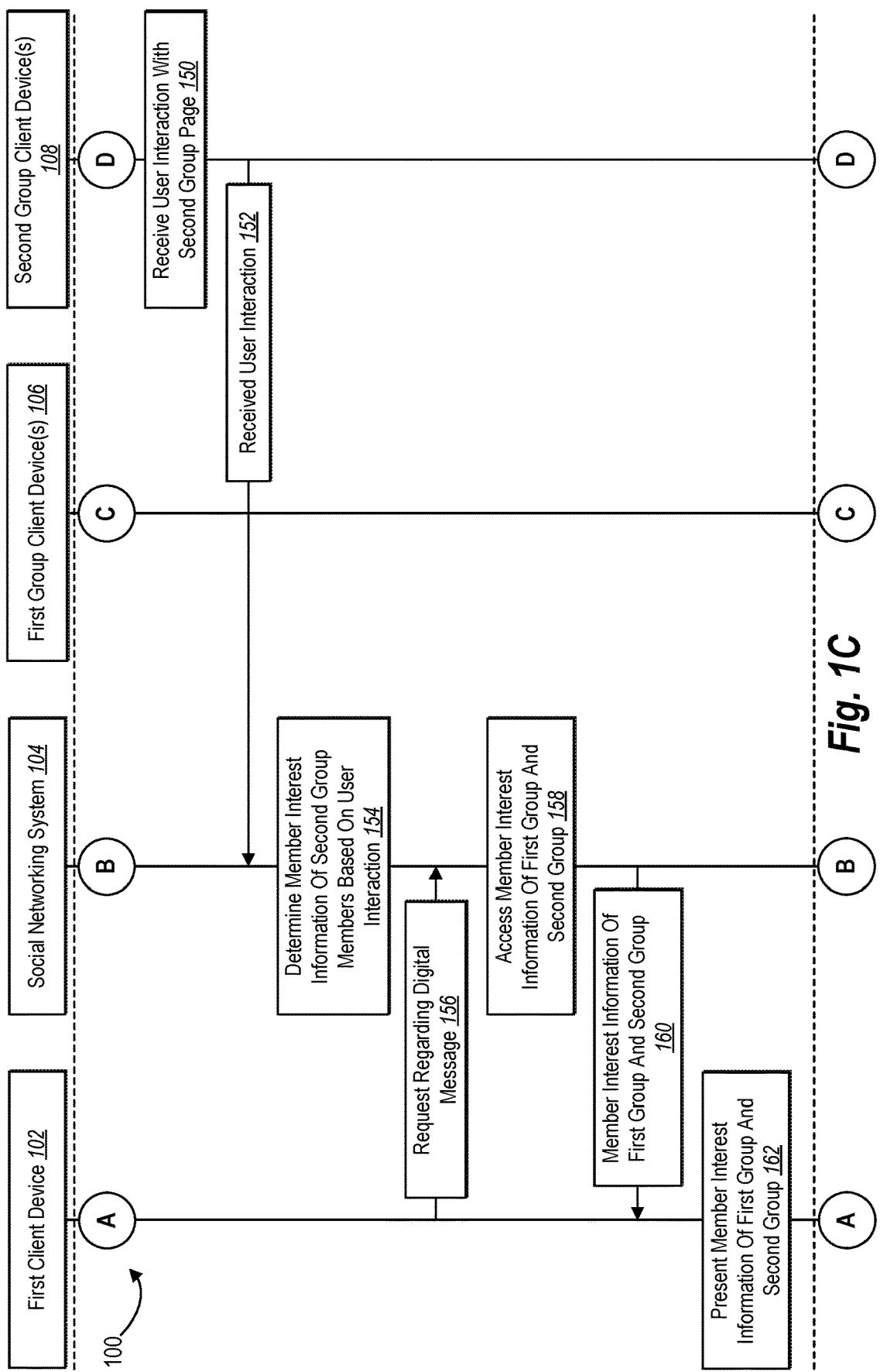

The social networking system 104 can also monitor user interactions and generate member interest information corresponding to other social networking groups. Indeed, the social networking system 104 can perform the acts 132-142 with a variety of additional social networking groups. For example, FIGS. 1B-1C illustrate the digital multi-group messaging system 100 performing the acts 144-154 in relation to the second group client device(s) 108. Specifically, the digital multi-group messaging system 100 (via the social networking system 104) receives (at the act 144) a request for a second social networking group page, sends (at the act 146) the second group page with the digital message to the second group client device(s) 108, presents (at the act 148) the second social networking group page with the digital message via the second group client device(s) 108, receives (at the act 150) user interaction with the second social networking group page, provides (at the act 152) the received user interaction to the social networking system 104, and determines (at the act 154) member interest information of members of the second social networking group based on the received user interaction.

Moreover, as mentioned above, the digital multi-group messaging system 100 can also provide the member interest information from a plurality of social networking groups via a user interface to a user. For example, as shown in FIG. 1C, the first client device 102 can perform the act 156 of sending a request regarding the digital message to the social networking system 104. To illustrate, the first client device 102 can send a request for member interest information corresponding to the digital message from the social networking system 104.

As shown in FIG. 1C, in response, the social networking system 104 can perform the act 158 of accessing the member interest information of the first social networking group and the second social networking group (i.e., the member interest information determined at acts 142, 152). Moreover, the social networking system 104 can perform the act 160 of providing the member interest information of the first social networking group and the member interest information of the second social networking group to the first client device 102.

Further, the first client device 102 can perform the act 162 of presenting the member interest information of the first social networking group and the second social networking group. In particular, the first client device 102 can display the member interest information of the first social networking group and the second social networking group together via a user interface. In this manner, one or more embodiments of the digital multi-group messaging system enable the user of the first client device 102 to review and respond to member interest information corresponding to the digital message via a single user interface. For example, the digital multi-group messaging system 100 can allow a user to respond to comments, modify a digital message, or otherwise manage the digital message across the first social networking group and second social networking group using the single user interface.

Figure 1D:
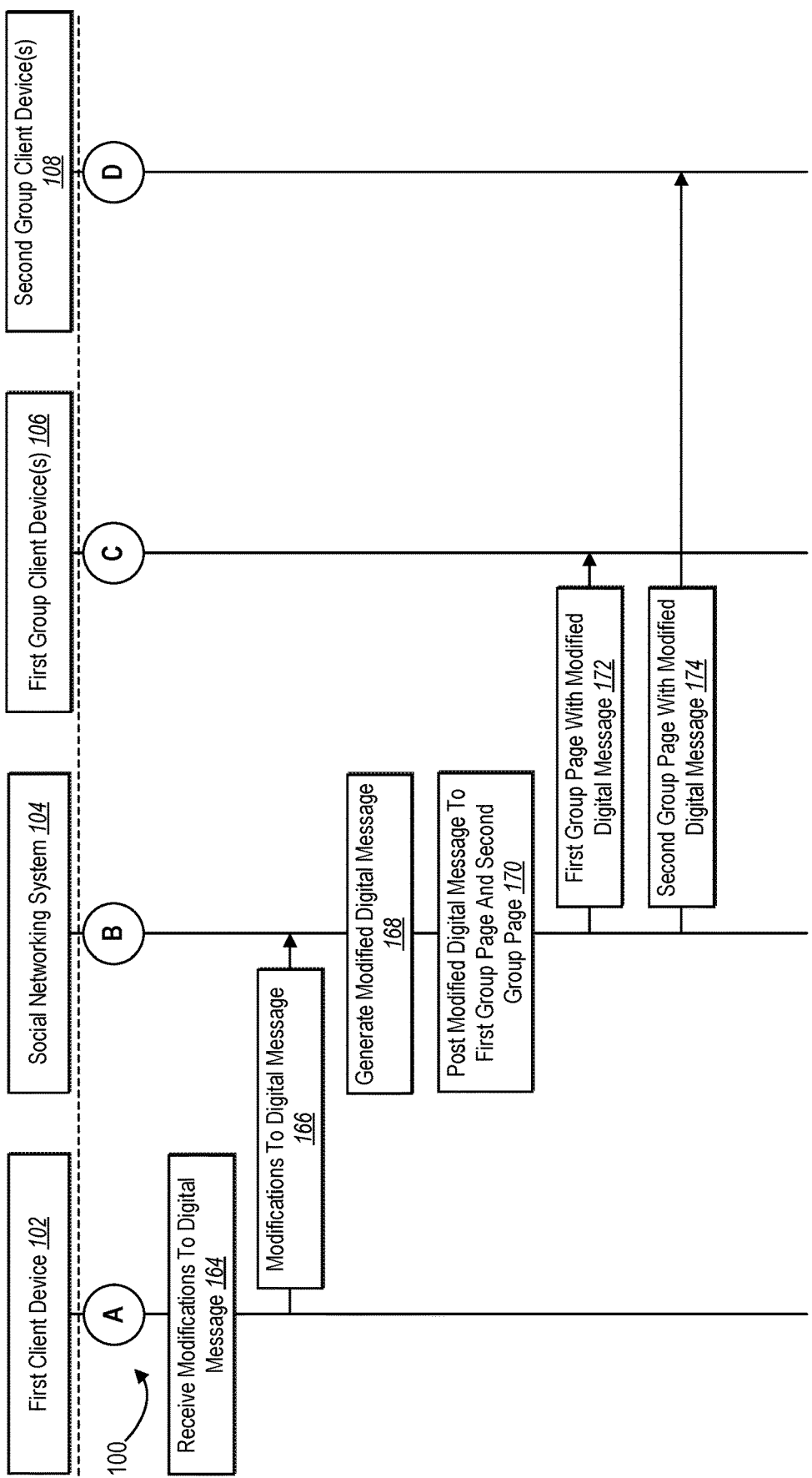

Indeed, as shown in FIG. 1D, the first client device 102 can perform the act 164 of receiving modifications to the digital message. For example, the first client device 102 can receive user input modifying digital message content, such as digital images, digital video, or digital text. In response to receiving user input modifying the digital message content, the first client device 102 can perform the act 166 of sending the modifications to the digital message to the social networking system 104. Based on the received modifications, the social networking system 104 can also perform the act 168 of generating a modified digital message (e.g., a modified digital message reflecting the modifications from the first client device 102).

Furthermore, the social networking system can provide the modified digital messages to the first social networking group and the social networking group. Indeed, as illustrated in FIG. 1D, the social networking system can perform the acts 170, 172, 174 of posting the modified digital message to the first social networking group page and the second social networking group page, providing the first social networking group page with the modified digital message to the first group client device(s) 106, and providing the second social networking group page with the modified digital message to the second group client device(s) 108. In this manner, the digital multi-group messaging system 100 can automatically distribute modifications to a digital message across multiple social networking groups based on modifications via a user interface at the first client device 102.

It will be appreciated that the method described in relation to FIGS. 1A-1D is intended to be illustrative of one or more methods in accordance with the present disclosure, and is not intended to limit potential embodiments. Alternative embodiments can include additional, fewer, or different acts than those articulated in FIGS. 1A-1D. For example, although the act 114 comprises drafting a digital message to a first social networking group and the act 116 comprises detecting the digital message to the first social networking group, in one or more embodiments, the digital multi-group messaging system detects a digital message that does not include a first social networking group. For example, the first client device 102 can draft a digital message and, (without selecting a first group), send a request for a suggested group to the social networking system 104. The social networking system 104 can detect the digital message and send a suggested group to the first client device (without the benefit of a first social networking group).

Similarly, although the act 124 illustrates receiving user selection of the second social networking group, it will be appreciated that a user can select any social networking group provided for display. For example, the digital multi-group messaging system 100 can suggest three different social networking groups for display to a user and the user can select a third social networking group. Furthermore, the digital multi-group messaging system 100 can generate a digital message and post the digital message to the third social networking group.

Additionally, the acts described herein may be performed in a different order, may be repeated or performed in parallel with one another, or may be performed in parallel with different instances of the same or similar acts. For example, rather than generating the digital message at the act 128 after receiving the selected second social networking group at act 126, the digital multi-group messaging system 100 can generate the digital message at another time. For example, the social networking system 104 can generate the digital message after detecting the digital message (at the act 116), or at some other time.

Figure 2:
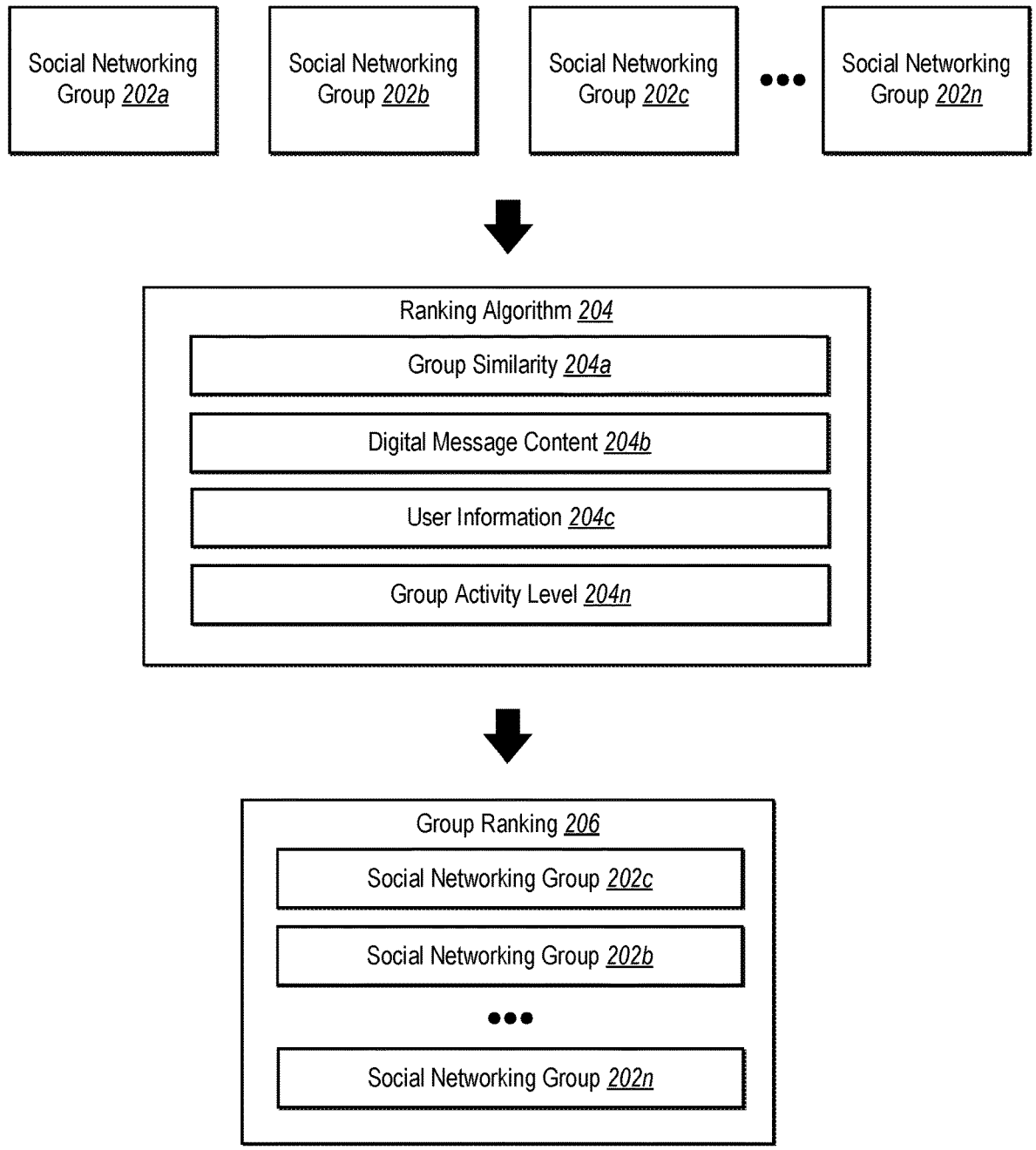
FIG. 2 illustrates a representation of applying a ranking algorithm to a plurality of social networking groups in accordance with one or more embodiments.

As mentioned previously, in one or more embodiments, the digital multi-group messaging system 100 selects social networking groups to suggest to a user. In particular, the digital multi-group messaging system 100 can utilize a ranking algorithm to select social networking groups. FIG. 2 illustrates selecting a set of social networking groups from a plurality of social networking groups utilizing a ranking algorithm in accordance with one or more embodiments.

Specifically, FIG. 2 illustrates a plurality of social networking groups 202a-202n. As discussed above, each of the plurality of social networking groups 202a-202n includes a plurality of members that have joined each respective social networking group. The digital multi-group messaging system 100 can select a set of the plurality of social networking groups 202a-202n to suggest to a user by applying a ranking algorithm 204. In particular, as illustrated in FIG. 2, the digital multi-group messaging system 100 can apply the ranking algorithm 204 based on a plurality of factors, including group similarity 204a, digital message content 204b, user information 204c, and group activity level 204n.

For example, in one or more embodiments, the ranking algorithm 204 analyzes group similarity 204a by comparing characteristics of two or more social networking groups. To illustrate, in one or more embodiments, a user drafts a digital message to a first social networking group and requests suggestions for additional social networking groups. The ranking algorithm 204 can determine characteristics of the first social networking group and compare the determined characteristics to characteristics of the plurality of social networking groups 202a-202n.

For instance, the ranking algorithm 204 can determine that the first social networking group is associated with a particular topic and/or category (e.g., baseball cards). In response, the ranking algorithm 204 can analyze the plurality of social networking groups 202a-202n for similar topics or categories (e.g., other social networking groups corresponding to baseball cards or sports collectors' items). The ranking algorithm 204 can determine a score based on similarity between the first social networking group topic and/or category and the topics or categories corresponding to each other social networking group and rank the social networking groups based on the determined score.

In addition to topic and/or category, the ranking algorithm 204 can analyze group similarity 204a based on one or a combination of a variety of additional social networking group characteristics. For example, the ranking algorithm 204 can determine similarity based on key words utilized on the social networking group page (e.g., utilizing natural language processing techniques to compare words utilized on social networking group pages). In addition, the ranking algorithm 204 can determine similarity based on location (e.g., utilizing location of members in a social networking group or location of an interest corresponding to a social networking group). Moreover, the ranking algorithm can analyze member information to determine similarity (e.g., comparing interests between members of a first social networking group and members of a second social networking group by analyzing user profiles, user interactions, edge information, and node information of the members) and social networking group size (e.g., comparing number of members or sales volume). Also, the ranking algorithm 204 can determine similarity based on products purchased and/or sold (e.g., comparing products purchased and/or sold between social networking groups).

Although some of the foregoing examples discuss analyzing group similarity in relation to a first social networking group (i.e., a first social networking group selected by a user in drafting a digital message), the digital multi-group messaging system 100 can also analyze group similarity in relation to other social networking groups. For example, in one or more embodiments, the digital multi-group messaging system 100 analyzes group similarity starting with social networking groups that a user has previously joined (i.e., social networking groups where a user is a member) to suggest additional social networking groups. To illustrate, the digital multi-group messaging system 100 can determine that a user is a member (or recently joined) a social networking group. The digital multi-group messaging system 100 can suggest an additional social networking group from the plurality of social networking groups 202a-202n based on a similarity between the social networking group (that the user is already a member of) and the plurality of social networking groups 202a-202n.

The ranking algorithm 204 can also rank social networking groups based on group similarity by analyzing common membership between social networking groups. In particular, the digital multi-group messaging system 100 can identify members in a first social networking group and determine that a particular number of the members in the first social networking group belong to a second social networking group. The ranking algorithm 204 can determine a similarity based on the number of the members in the first social networking group that belong to the second social networking group.

Notwithstanding that many of the foregoing examples discuss group similarity between two social networking groups, the digital multi-group messaging system 100 can identify group similarity between more than two social networking groups. For example, a user can select a first social networking group and a second social networking group to which to post a digital message. The digital multi-group messaging system 100 can determine a similarity between the first and second social networking groups and a third social networking group. To illustrate, the digital multi-group messaging system 100 can determine a particular number of the members of the first social networking group that belong to the third social networking group and a particular number of the members of the second social networking group that belong to the third social networking group. The digital multi-group messaging system 100 can rank (and select) the third social networking group based on the similarity (e.g., common membership) between the first social networking group, the second social networking group, and the third social networking group. The ranking algorithm 204 can similarly compare greater than two social networking groups in relation to other group characteristics discussed herein.

As shown in FIG. 2, in addition to group similarity 204a, the ranking algorithm 204 can also consider digital message content 204b. For example, in one or more embodiments, the ranking algorithm 204 analyzes digital message content 204b corresponding to a digital message drafted by a user and compares the digital message content 204b to characteristics of the plurality of social networking groups 202a-202n. To illustrate, in one or more embodiments, the ranking algorithm 204 analyzes digital message content 204b for one or more key words and then compares the one or more key words of the digital message content 204b to the plurality of social networking groups 202a-202n (e.g., topics, categories, or keywords from the social networking groups 202a-202n).

To illustrate, the ranking algorithm 204 can analyze digital message content 204b and identify a particular event (e.g., a group running event at a particular location). In response, the ranking algorithm 204 can analyze the plurality of social networking groups 202a-202n that correspond to the particular event (e.g., analyze the social networking groups 202a-202n for running groups near the particular location). More specifically, the ranking algorithm 204 can analyze the social networking groups 202a-202n by comparing the particular event with topics and/or categories of the social networking groups 202a-202n (e.g., identify social networking groups categorized as running groups). Similarly, the ranking algorithm 204 can compare the particular event with keywords utilized by the social networking groups 202a-202n (e.g., utilize natural language processing techniques to analyze social networking posts in the social networking groups to determine that members of the group discuss running in the particular location). Moreover, the ranking algorithm 204 can compare the particular event with information corresponding to group members (e.g., analyze user profiles, edge information, and or node information corresponding to group members to determine that members of social networking groups have an interest in running in the particular location).

Although the previous examples reference a particular event in digital message content, the digital multi-group messaging system 100 can detect digital message content of any type to rank and/or select a social networking group via the ranking algorithm 204. For example, the digital multi-group messaging system 100 can detect a product (or service), product price, digital image, digital video, digital text, or other digital message content and utilize the digital message content to rank and/or select a social networking group.

For example, the digital multi-group messaging system 100 can detect a product in digital message content and identify social networking groups corresponding to the product (e.g., social networking groups from the plurality of social networking groups 202a-202n that correspond to a topic or category related to the product, that discuss the product in the social networking group page, that purchase and/or sell the product via the social networking group page at a higher rate or price, and/or that have member interest information regarding a similar product). Similarly, the digital multi-group messaging system 100 can detect a digital image (e.g., a picture of a product) and utilize the digital image to identify a social networking group page (e.g., utilize digital image recognition technology to identify the product and then identify social networking pages that correspond to the product or identify social networking group pages that contain similar digital images).

In addition to digital message content 204b, as shown in FIG. 2, the ranking algorithm 204 can also consider user information 204c in ranking the plurality of social networking groups 202a-202n. In particular, the ranking algorithm 204 can compare user information 204c (e.g., information regarding the user drafting a digital message) with characteristics of the plurality of social networking groups 202a-202n in ranking the plurality of social networking groups 202a-202n. For example, the digital multi-group messaging system 100 can analyze a user profile and/or node information/edge information corresponding to a user to determine user interests, prior sales and/or purchases, location, demographic information, social networking groups a user has joined, device types utilized by a user, and/or software or applications utilized by a user. The ranking algorithm 204 can then compare this user information to characteristics of the plurality of social networking groups 202a-202n to determine a correspondence between the user information and the plurality of social networking groups 202a-202n.

To illustrate, the ranking algorithm 204 can compare user information corresponding to a user drafting a digital message to corresponding member information of the plurality of social networking groups 202a-202n (e.g., identify social networking groups having members with similar interests, members in a similar location, or members having similar demographic information). For instance, in one or more embodiments, the digital multi-group messaging system 100 determines that a user drafting a digital message has previously bought and sold a particular product. The ranking algorithm 204 can rank the plurality of social networking groups 202a-202n based on a correspondence between the particular product that the user has previously brought and sold.

The ranking algorithm 204 can compare user information corresponding to a user drafting a digital message to topics and/or categories corresponding to the plurality of social networking groups 202a-202n (e.g., compare an identified user interest in sports to social networking groups 202a-202n to identify social networking groups corresponding to sports topics/categories). Moreover, the ranking algorithm 204 can compare user information corresponding to a user drafting a digital message to social networking posts and or user interaction on a social networking page to rank the plurality of social networking groups 202a-202n (e.g., identify a user interest in a particular product based on historical purchases and sales of the product by the user and analyze social networking posts to determine discussion, purchases, and/or sales regarding the product).

In addition to user information 204c, as shown in FIG. 2, the ranking algorithm 204 can also consider group activity level 204n in ranking and/or selecting social networking groups from the plurality of social networking groups 202a-

202n. For example, in one or more embodiments, the ranking algorithm 204 ranks the plurality of social networking groups 202a-202n based on activity level, such as a measure of posts (e.g., the number of posts, length of posts, or type of posts), comments (e.g., the number of posts or the length of posts), views, reactions, clicks, time (e.g., time viewing particular posts), purchases, products for sale, products sold, or sales volume within a social networking group.

To illustrate, a user may generate a digital message for selling a product. The digital multi-group messaging system 100 can analyze the social networking groups 202a-202n to determine the number of for sale posts or a relative number of for sale posts (e.g., the number of for sale posts compared to the number of other posts, such as discussion posts) in the social networking group, the number of products sold via the social networking group (e.g., the total number of products or the number of the specific product sold via the social networking group), and/or the number of comments within the social networking group. Moreover, the digital multi-group messaging system 100 can analyze the social networking groups 202a-202n for activity level related to similar products (e.g., number of comments regarding similar products or number of sales of similar products). The ranking algorithm 204 can generate a score corresponding to activity level of the plurality of social networking groups 202a-202n based on these determined measures of activity level.

It will be appreciated that although FIG. 2 illustrates that the ranking algorithm 204 uses factors 204a-204n to rank and/or select social networking groups, the ranking algorithm 204 can utilize other factors. For example, in one or more embodiments, the ranking algorithm 204 can rank and/or select a social networking group of the plurality of social networking groups 202a-202n based on previous performance of a digital message. To illustrate, in one or more embodiments, the digital multi-group messaging system 100 can suggest a set of social networking groups to a user and post a digital message to two of the social networking groups. The digital multi-group messaging system 100 can monitor user interaction with the digital message via the two social networking groups and suggest additional social networking groups based on the monitored user interaction.

For example, consider a situation where a first social networking group provides ten comments to the digital message and a second social networking group provides zero comments to the digital message. The digital multi-group messaging system 100 can analyze the characteristics of the first social networking group and/or the second social networking group and suggest additional social networking groups based on the characteristics. In particular, the digital multi-group messaging system 100 can identify social networking groups similar to the first social networking group and/or social networking groups dis-similar to the second social networking group.

Similarly, the digital multi-group messaging system 100 can analyze members that interact with a digital message and select additional social networking groups based on the analysis. For example, in relation to the previous example, the digital multi-group messaging system 100 can analyze the ten members that commented on the digital message and identify additional social networking groups with members similar to the ten members that commented on the digital message. Similarly, the digital multi-group messaging system 100 can analyze members that viewed (but did not comment) on a digital message and identify social networking systems that have members different than the members that viewed (but did not comment) on the digital message.

In addition, although not illustrated in FIG. 2, the ranking algorithm 204 can also rank and/or select social networking groups based on a measure of group health (i.e., a measure of the continued vitality of a social networking group). For example, the digital multi-group messaging system 100 can determine a measure of group health based on factors that include, a measure of new members (e.g., members that have joined within a particular period of time), a measure of member duration (e.g., a time that members stay within a group), a measure of leaving members (e.g., a measure of members leaving within a particular period of time), and/or a number of members in the group. The digital multi-group messaging system 100 can also determine a measure of group health based on measures of a group activity level (as discussed above), such as a measure of posts (e.g., a number of posts within a period of time) or a measure of comments (e.g., a number of comments within a particular time).

As shown in FIG. 2, based on the factors 204a-204n (and/or other factors), the ranking algorithm 204 can generate a group ranking 206. In particular, the ranking algorithm 204 can sort the plurality of social networking groups 202a-202n into the group ranking 206. For example, in one or more embodiments, the ranking algorithm 204 calculates a score corresponding to one or more of the factors 204a-204n and then generates a composite score. The ranking algorithm 204 can the generate the group ranking 206 based on the composite score (e.g., highest composite score ranked first, lowest composite score ranked last).

The digital multi-group messaging system 100 can also utilize the group ranking 206 to select a social networking group to suggest to a user. For example, the digital multi-group messaging system 100 can utilize the group ranking 206 to select a social networking group to suggest to a user by applying one or more thresholds to the group ranking 206. To illustrate, the digital multi-group messaging system 100 can select social networking groups to suggest by applying a threshold to the group ranking 206 based on a particular number (or percentage) of social networking groups (e.g., a threshold of the top three social networking groups from the group ranking 206). Similarly, the digital multi-group messaging system 100 can apply a threshold based on a particular score (e.g., a threshold of social networking groups having a composite score above a particular number). Moreover, the digital multi-group messaging system 100 can apply a threshold based on both a number of social networking groups and a particular score (e.g., suggest social networking groups that exceed a particular composite score, while limiting the suggested social networking groups to a maximum number). In this manner, the digital multi-group messaging system 100 can rank and select social networking groups to suggest to a user.

Figure 3B:
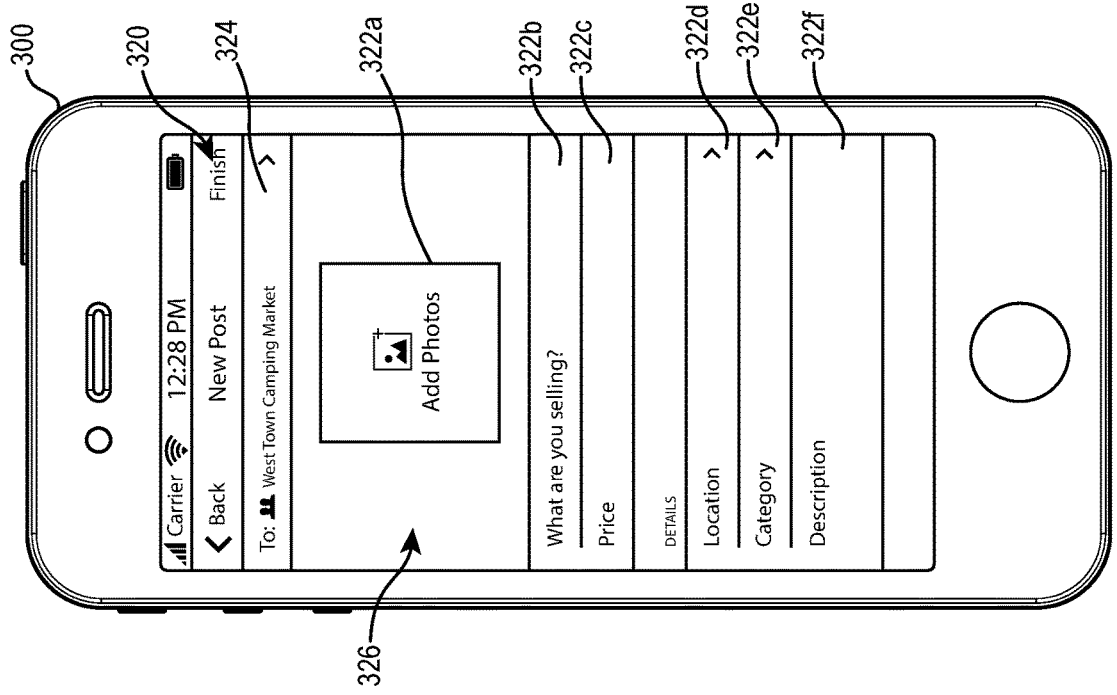
Figure 3A:
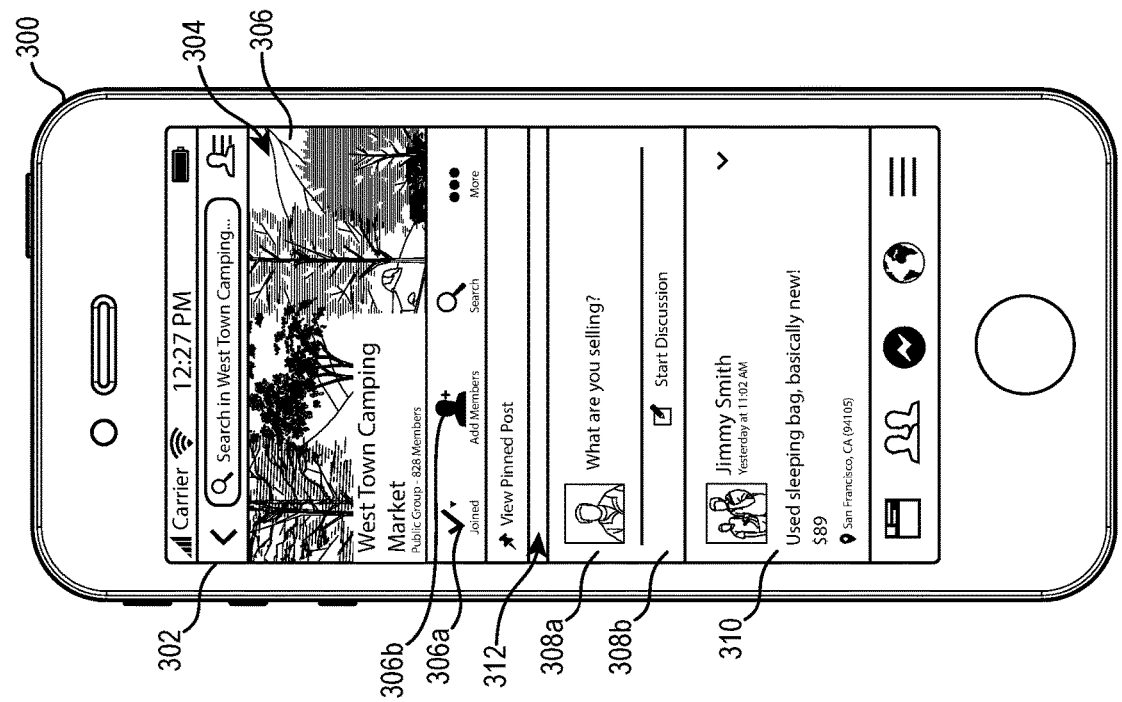

Turning now to FIGS. 3A-3F additional detail will be provided regarding suggesting social networking groups to a user and posting a digital message to multiple social networking groups in accordance with one or more embodiments. Specifically, FIG. 3A illustrates a computing device 300 (e.g., the first client device 102) with a touchscreen 302 displaying a user interface 304. As shown, the user interface 304 includes a visual indication of a social networking group page 312. In particular, the user interface includes a social networking group identification area 306, post elements 308a and 308b, and a social networking feed 310.

As shown, the social networking group indication area 306 provides information regarding a social networking group corresponding to the social networking group page 312. For example, the social networking group indication area 306 includes a social networking system group name (i.e., "West Town Camping Market"), a number of group members (i.e., "828 members"), and a digital image corresponding to the social networking group (i.e., a digital image of trees). The social networking group indication area 306 also includes a selectable option 306a indicating whether a user of the computing device 300 is a member of the social networking group (e.g., "Joined"). Upon user interaction with the selectable option 306a, the user can also manage membership in the social networking group (e.g., leave the social networking group). Furthermore, the social networking group indication area 306 includes an add members selectable element 306b (i.e., for inviting additional users to join the social networking group).

As illustrated in FIG. 3A, the user interface 304 also includes a social networking feed 310. The social networking feed 310 includes a plurality of digital messages (e.g., digital messages from members of the social networking group posted to the social networking group page 312). For example, as shown, the social networking feed 310 includes a digital message posted to the social networking group page 312 from "Jimmy Smith" regarding a used sleeping bag for sale in San Francisco, Calif. Members (and, depending on privacy settings of the group, non-members) of the social networking group can navigate to the social networking group page 312 and view digital messages posted to the social networking feed 310.

As mentioned briefly above, the user interface 304 also includes the post elements 308a and 308b. Upon user interaction with the post elements 308a or 308b, the digital multi-group messaging system 100 can provide a user interface for composing a digital message to post to one or more social networking groups. For example, upon receiving a user interaction with the post element 308b, the digital multi-group messaging system 100 can provide a user interface for generating a digital message to post to the social networking group page 312 regarding an item for discussion. Moreover, upon receiving a user interaction with the post element 308a, the digital multi-group messaging system 100 can provide a user interface for generating a digital message to post to the social networking group page 312 regarding a product to sell.

For instance, FIG. 3B illustrates the computing device 300 upon receiving a selection of the post element 308a. In particular, FIG. 3B illustrates the computing device 300 displaying a user interface 320 for drafting a digital message 326 regarding a product. In particular, the user interface 320 includes a social networking group suggestion element 324 and a plurality of digital message elements 322a-322f.

Based on user interaction with the digital message elements 322a-322f, the digital multi-group messaging system 100 can add digital message content to the digital message 326. For example, a user can interact with the digital image element 322a to add a digital image to the digital message 326. Similarly, the digital multi-group messaging system 100 can add a name of a product, a price, a location, a category, or a description based on user interaction with the digital message elements 322b-322f, respectively.

Although FIG. 3B includes user interface elements directed toward generating a digital message corresponding to a product sale, the digital multi-group messaging system 100 can also generate a variety of other digital messages. For example, the digital multi-group messaging system 100 can generate a digital message regarding an event (e.g., with digital elements for time, location, date, or event name). Moreover, the digital multi-group messaging system 100 can generate a digital message with general digital elements for generating a discussion message, not specific to any particular subject.

In relation to FIG. 3B, however, based on user interaction with the social networking group suggestion element 324, the digital multi-group messaging system 100 can suggest one or more social networking groups to suggest to the user via the computing device 300. In particular, upon selection of the social networking group suggestion element 324, the digital multi-group messaging system 100 can provide a user interface that includes suggested social networking groups to which to post the digital message 326.

Figure 3D:
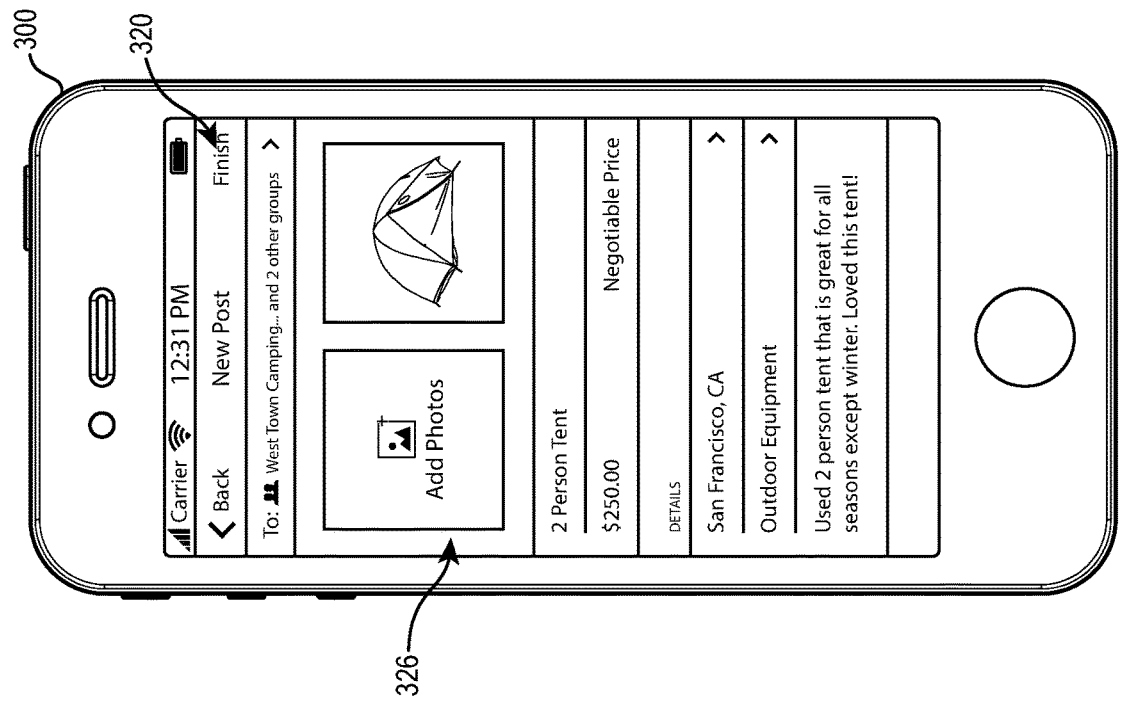
Figure 3C:
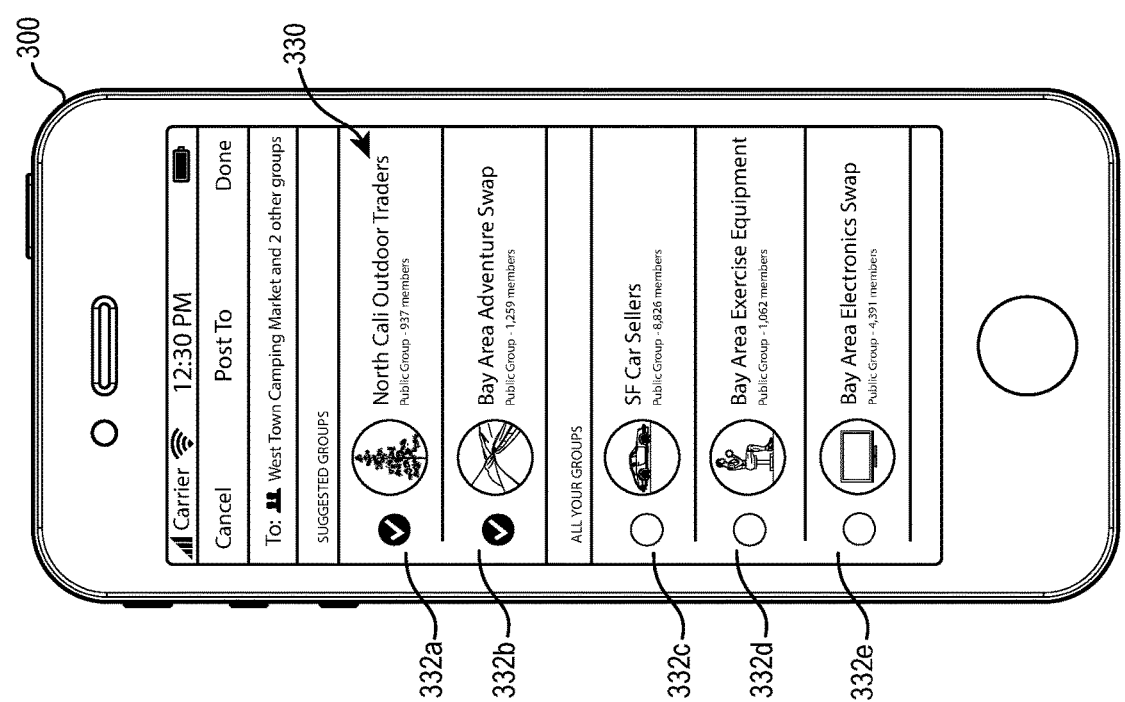

For example, FIG. 3C illustrates the computing device 300 with a user interface 330 that includes suggested social networking groups 332a-332e. In relation to the embodiment of FIG. 3C, upon receiving a selection of the social networking group suggestion element 324 (see FIG. 3B), the digital multi-group messaging system 100 selects the suggested social networking groups 332a-332e from a plurality of social networking groups managed by the digital multi-group messaging system 100 (e.g., utilizing the ranking algorithm 204 discussed in detail above). Moreover, the digital multi-group messaging system 100 provides the user interface 330 and the suggested social networking groups 332a-332e for display via the computing device 300. After providing the user interface 330 and the suggested social networking groups 332a-332e for display, the digital multi-group messaging system 100 receives user input of a selection of the suggested social networking groups 332a, 332b (i.e., an indication of a touch gesture corresponding to the suggested social networking groups 332a, 332b).

Notably, in relation to FIG. 3C, the digital multi-group messaging system 100 does not have access to digital message content because the user has not provided digital message content in relation to the digital message 326. Accordingly, the digital multi-group messaging system 100 selects the suggested social networking groups 332a-332e based on other factors. In particular, the digital multi-group messaging system 100 selects the suggested social networking groups 332a-332e based on the "West Town Camping Market" social networking group previously identified by the user (e.g., group similarity with the "West Town Camping Market" social networking group), user information (e.g., user information corresponding to the user of the computing device 300 and members of the "West Town Camping Market" social networking group), group activity level, and other factors mentioned in relation to FIG. 2.

For example, the digital multi-group messaging system 100 selects the social networking group 332a (i.e., "North Cali Outdoor Traders") based on group similarity with the "West Town Camping Market" social networking group. Indeed, the digital multi-group messaging system 100 detects a correspondence in category (i.e., outdoor products shopping groups), based on similarity in keywords utilized on the social networking group pages, and based on a similarity in members (i.e., a threshold number of members corresponding to the "North Cali Outdoor Traders" social networking group are also members of the "West Town Camping Market" social networking group). Similarly, the digital multi-group messaging system 100 selects the social networking group 332b (i.e., "Bay Area Adventure Swap") based on group similarity (i.e., similarity in location and category) and based on activity level (i.e., a high number of recent posts and comments via the social networking group 332b).

Furthermore, the digital multi-group messaging system 100 selects the social networking groups 332c-332e based on user information (e.g., the user of the computing device 300 has previously joined the social networking groups 332c-332e), based on location (i.e., members of the social networking groups 332c-332e are located in close proximity to the user of the computing device 300), and/or group similarity (e.g., the groups 332c-332e also contain a large number of for sale posts).

As shown in FIG. 3C, the digital multi-group messaging system 100 can arrange suggested social networking groups in a particular order. For instance, in relation to FIG. 3C, the digital multi-group messaging system 100 arranges the social networking groups 332a-332e based on whether the user of the computing device 300 is already a member of the suggested social networking group. In particular, the digital multi-group messaging system 100 provides a first set of suggested social networking groups that the user has not joined and a second set of suggested social networking groups that the user has previously joined.

Although FIG. 3C illustrates a particular arrangement of social networking groups, the digital multi-group messaging system 100 can arrange suggested social networking groups based on a variety of factors. For example, the digital multi-group messaging system 100 can arrange social networking groups suggested to a user based on a ranking (e.g., a composite score from the ranking algorithm 204). Similarly, the digital multi-group messaging system 100 can arrange social networking groups based on group similarity (e.g., similarity to "West Town Camping Market") or other factors enumerated above in relation to the ranking algorithm 204.

As shown in FIG. 3C, based on user interaction with the suggested social networking groups 332a-332b the digital multi-group messaging system 100 can select (or un-select) suggested social networking groups. Indeed, as illustrated in FIG. 3C, the user of the computing device 300 has selected the social networking groups 332a, 332b. The digital multi-group messaging system 100 can select or un-select any of the suggested social networking groups.

As mentioned above, the digital multi-group messaging system 100 can also provide additional suggested social networking groups based on additional information determined by the digital multi-group messaging system 100 over time. Indeed, the digital multi-group messaging system 100 can suggest additional social networking groups as the digital multi-group messaging system 100 detects additional digital message content or other information bearing on suggested social networking groups.

For example, FIGS. 3D-3E illustrate suggesting additional social networking groups based on additional information detected by the digital multi-group messaging system 100. In particular, as shown in FIG. 3D, upon selecting the social networking groups 332a-332b, the digital multi-group messaging system 100 displays the user interface 320 including the digital message 326. Moreover, based on user input, the digital multi-group messaging system 100 receives and identifies additional digital message content. In particular, as shown in FIG. 3D, the user of the computing device 300 provides user input of additional digital message content, including a digital image (i.e., a picture of a tent), information regarding the product for sale (i.e., "2 Person Tent"), a price (i.e., "$250" and "Negotiable Price"), a location (i.e., "San Francisco"), a category (i.e., "Outdoor Equipment"), and a description (i.e., "Used 2 person tent . . . ").

The digital multi-group messaging system 100 detects the digital message content and provides additional suggested social networking groups. For example, as shown in FIG. 3E, the digital multi-group messaging system 100 provides the user interface 330 with a new suggested social networking group 340. In particular, the digital multi-group messaging system 100 selects and provides the new suggested social networking group 340 based on additional digital message content (i.e., the new digital message content illustrated in FIG. 3D).

For example, the digital multi-group messaging system 100 determines that the digital message 326 includes a tent for sale in San Francisco. Moreover, the digital multi-group messaging system 100 determines a correspondence between the product (i.e., the tent) and the location (i.e., San Francisco) from the digital message 326 and the new suggested social networking group 340. In particular, the digital multi-group messaging system 100 determines a correspondence between the product from the digital message 326 and a category of the new suggested social networking group 340 (i.e., tents), determines a correspondence between the product from the digital message 326 and content of the social networking group (i.e., determines that tent is one of the keywords of the social networking group page), and determines a correspondence between the location from the digital message 326 and a location associated with the new social networking group 340 (i.e., the new suggested social networking group 340 has "San Francisco" in the title and has a large number of members located in San Francisco).

As illustrated in FIG. 3E, upon selecting the new suggested social networking group 340, the digital multi-group messaging system 100 also provides the new suggested social networking group 340 for display and selection. For example, as shown in FIG. 3E, the digital multi-group messaging system 100 provides the new suggested social networking group 340 for display via the user interface 330. Moreover, the user of the computing device 300 interacts with the new suggested social networking group 340 and the suggested social networking group 332b (resulting in selection of the new suggested social networking group 340 and de-selection of the suggested social networking group 332b).

Although the embodiment of FIG. 3E selects and provides additional social networking groups based on additional digital message content from the digital message 326, it will be appreciated that the digital multi-group messaging system 100 can select and provide additional social networking groups based on any additional information. For instance, the digital multi-group messaging system 100 can select and provide additional social networking groups based on a change in any of the factors considered by the ranking algorithm 204. For example, in one or more embodiments, the digital multi-group messaging system 100 can suggest a new social networking group based on a user selection or de-selection of a social networking group. To illustrate, in relation to FIG. 3E, upon detecting that the user de-selects the social networking group 332b and selects the new social networking group 340, the digital multi-group messaging system 100 can modify suggested social networking groups (e.g., suggest social networking groups similar to the new social networking group 340 and/or dis-similar from the social networking group 332b).

Moreover, it will be appreciated that the digital multi-group messaging system 100 can suggest social networking groups at a variety of times and in response to a variety of triggers. For instance, in one or more embodiments, the digital multi-group messaging system 100 can suggest social networking groups in response to a user interaction with a user interface element (e.g., the social networking group suggestion element 324). In other embodiments, however, the digital multi-group messaging system 100 can automatically (i.e., without user interaction with a selectable element) suggest social networking groups (e.g., based on detecting new information bearing on suggested social networking groups). For example, in one or more embodiments, the digital multi-group messaging system 100 detects a digital message (or other information relevant to selecting a social networking group) and automatically provides a notification of suggested social networking groups. In particular, in relation to the embodiment of FIG. 3E, in response to detection of the additional digital message content, the digital multi-group messaging system 100 can automatically provide the new suggested social networking group 340.

In addition, although FIG. 3E illustrates adding the new suggested social networking group 340, it will be appreciated that the digital multi-group messaging system 100 can modify a list of suggested social networking groups in a variety of ways. For example, the digital multi-group messaging system 100 can remove one or more social networking groups based on additional detected information. Similarly, the digital multi-group messaging system 100 can replace a social networking group with a different social networking group.

As mentioned previously, the digital multi-group messaging system 100 can also post digital messages to a plurality of social networking groups. For example, FIG. 3F illustrates posting a digital message to a social networking group page in accordance with one or more embodiments. In particular, FIG. 3F illustrates a computing device 350 of a member of a social networking group (i.e., a member of the "West Town Camping" social networking group). As shown, the computing device 350 includes a user interface 352 that includes the social networking group page 312 with the social networking feed 316. Notably, however, the social networking feed 316 now includes a new post 354 that includes the digital message 326. In particular, the digital multi-group messaging system 100 posts the digital message 326 to the social networking group page 312 as the new post 354 such that members of the "West Town Camping Market" social networking group can view the new post 354.

Similarly, the digital multi-group messaging system 100 posts the digital message 326 to other selected social networking groups. Indeed, the digital multi-group messaging system 100 posts the digital message 326 to the social networking group 332a (i.e., the "North Cali Outdoor Traders" social networking group), and the new suggested social networking group 340 (i.e., the "San Francisco Tent Mart" social networking group).

Notably, in relation to the embodiment of FIG. 3F, the digital multi-group messaging system 100 posts the digital message 326 to three social networking groups based on user input corresponding to a single digital message (i.e., the digital message 326). Indeed, from the perspective of the user of client device 300, upon simply drafting a digital message, the digital multi-group messaging system 100 provides suggested social networking groups, and posts the digital message to a plurality of suggested social networking groups without requiring the user to navigate to three separate social networking group pages or generate three separate digital messages. In this manner, the digital multi-group messaging system 100 can save significant time and resources in identifying groups and posting multiple digital messages to multiple social networking groups.

Although FIGS. 3B-3F illustrate selecting social networking groups corresponding to a digital message regarding a product, the digital multi-group messaging system 100 can also select social networking groups in relation to other digital messages. Indeed, the digital multi-group messaging system 100 can suggest social networking groups and post digital messages corresponding to any variety of events, topics, or subjects.

As mentioned previously, in addition to posting digital messages to a plurality of social networking groups, the digital multi-group messaging system 100 can also provide user interfaces for managing digital messages posted to a plurality of social networking groups. FIGS. 4A-4E illustrate user interfaces for managing a digital message posted to multiple social networking pages in accordance with one or more embodiments.

In particular, FIG. 4A illustrates the computing device 300 with the user interface 304 including the social networking group page 312. Notably, the user interface 304 in relation to FIG. 4A includes the social networking group post element 402. The social networking group post element 402 indicates that the user of the computing device 300 has posted two digital messages (i.e., sale posts) in the social networking group page 312.

Moreover, upon user interaction with the social networking group post element 402, the digital multi-group messaging system 100 can display a user interface for managing digital messages posted to a plurality of social networking groups. For example, FIG. 4B illustrates the computing device 300 displaying a user interface 410 that includes a plurality of post indicators 412a-412c. Each of the post indicators corresponds to a digital message posted (by the user of the computing device 300) to at least one social networking group. For example, the post indicator 412a corresponds to the digital message 326, which the digital multi-group messaging system 100 posted to three social networking groups (as described above in relation to FIGS. 3E-3F).

As shown, each post indicator 412a-412c includes information regarding the corresponding digital message. For example, the post indicators 412a-412c include digital images, a product name, a price, and an archive date (i.e., a date that the post corresponding to the digital message will be archived and removed from social networking group pages). Moreover, the post indicators 412a-412c can also include some member interest information corresponding to the social networking groups to which corresponding digital messages are posted. For example, post indicator 412a includes a number of comments corresponding to the three social networking groups where the digital multi-group messaging system 100 posts the digital message 326.

Specifically, the digital multi-group messaging system 100 monitors social networking groups where digital messages are posted and tracks user interactions with the digital messages. Indeed, as described above, the digital multi-group messaging system 100 can track a variety of user interactions, and based on the monitored user interactions, determine member interest information, such as a number of comments, a number of views, or a number of reactions.

Thus, in relation to FIG. 4B, the digital multi-group messaging system 100 tracks user interactions with three social networking groups where the digital multi-group messaging system 100 posts the digital message 326. The digital multi-group messaging system 100 determines that across the three social networking groups, members have provided a total of seven new comments. Accordingly, the digital multi-group messaging system 100 provides the number of comments for display via the post indicator 412a. In this manner, the user of the computing device 300 can easily gauge member interest corresponding to various posts across multiple social networking groups via a single user interface. Indeed, the user can simultaneously view member interest information corresponding to a plurality of digital messages posted in a plurality of social networking groups.

Upon user interaction with the post indicators 412a-412c, the digital multi-group messaging system 100 can provide additional information regarding digital messages corresponding to each post indicator. For instance, the digital multi-group messaging system 100 can provide information regarding member interest information corresponding to each social networking group to which the digital multi-group messaging system 100 has posted a digital message. For example, FIG. 4C illustrates the computing device 300 displaying a user interface 420 that includes a plurality of social networking group elements 422a-422c corresponding to the digital message 326. Moreover, the user interface 420 includes a comment filter element 424 and a digital message and comment display area 426.

As shown, the social networking group elements 422a-422c each correspond to a social networking group where the digital multi-group messaging system 100 posts the digital message 326. Indeed, as discussed in relation to FIGS. 3D-3F, the digital multi-group messaging system 100 posts the digital message to the "West Town Camping Market" social networking group, the "North Cali Outdoor Traders" social networking group, and the "San Francisco Tent Mart" social networking group. In addition to identifying the social networking groups, the social networking group elements 422a-422c provide member interest information corresponding to each social networking group. For example, the social networking group element 422a indicates that the digital message 326 has received four comments from members of the "West Town Camping Marketing" social networking group while the social networking group element 422b illustrates that the digital message 326 has received two comments from members of the "North Cali Outdoor Traders" social networking group.

As shown, the user interface 420 also includes the digital message and comment display area 426. In relation to FIG. 4C, the digital multi-group messaging system 100 utilizes the digital message and comment display area 426 to provide the digital message 326 for display as well as comments corresponding to the digital message 326. The digital multi-group messaging system 100 can also modify the list of comments provided in the digital message and comment display area 426.

For example, based on user interaction with the social networking group elements 422a-422c, the digital multi-group messaging system 100 can modify the list of comments displayed in the digital message and comment display area 426. For example, based on user selection of the social networking group element 422a, the digital multi-group messaging system 100 can modify the digital message and comment display area 426 to display only comments from "West Town Camping Market" social networking group members (and exclude comments from the "North Cali Outdoor Traders" social networking group, and the "San Francisco Tent Mart" social networking group).

In addition, the user interface 420 also includes the comment filter element 424. As shown, based on user interaction with the comment filter element 424, the digital multi-group messaging system 100 can display a plurality of group filter indicators 424a-424d. Moreover, based on user interaction with the group filter indicators 424a-424d, the digital multi-group messaging system 100 can select comments to provide for display (i.e., via the digital message and comment display area 426).

For example, FIG. 4C illustrates that the user of the computing device 300 has selected the group filter indicators 424b, 424c corresponding to the "West Town Camping Market" social networking group and the "North Cali Outdoor Trackers" social networking group. In response, the digital multi-group messaging system 100 modifies the digital message and comment display area 426 to display only comments from the "West Town Camping Market" social networking group and the "North Cali Outdoor Traders" social networking group. Specifically, FIG. 4D illustrates the user interface 420 and the digital message and comment display area 426 with only comments from the "West Town Camping Market" social networking group and the "North Cali Outdoor Traders" social networking group.

Figure 4D:
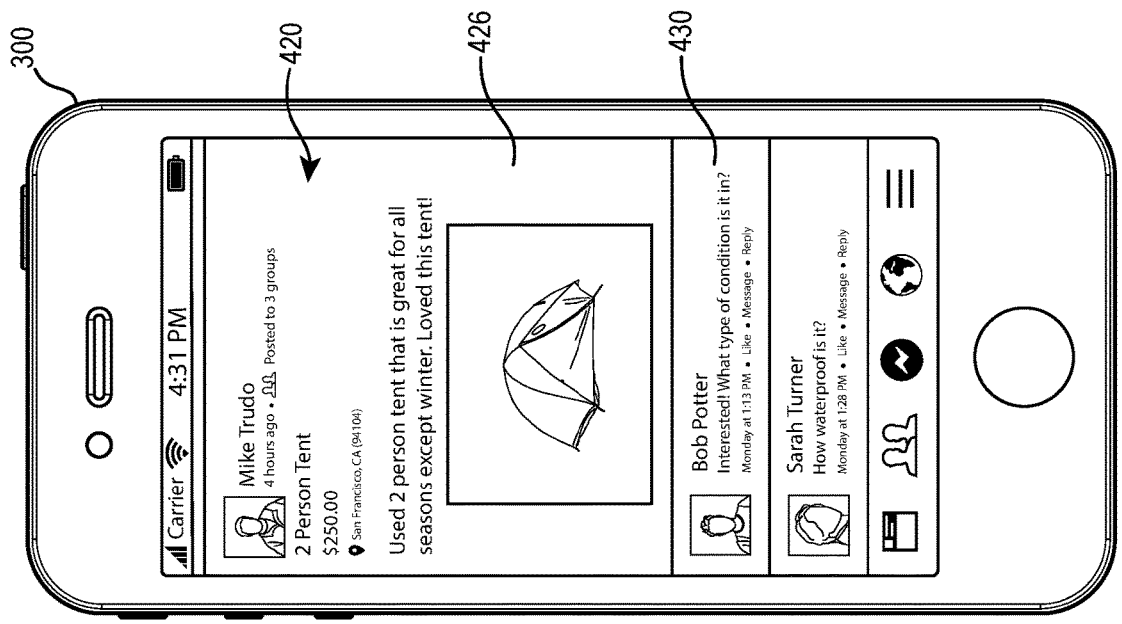
Figure 4C:
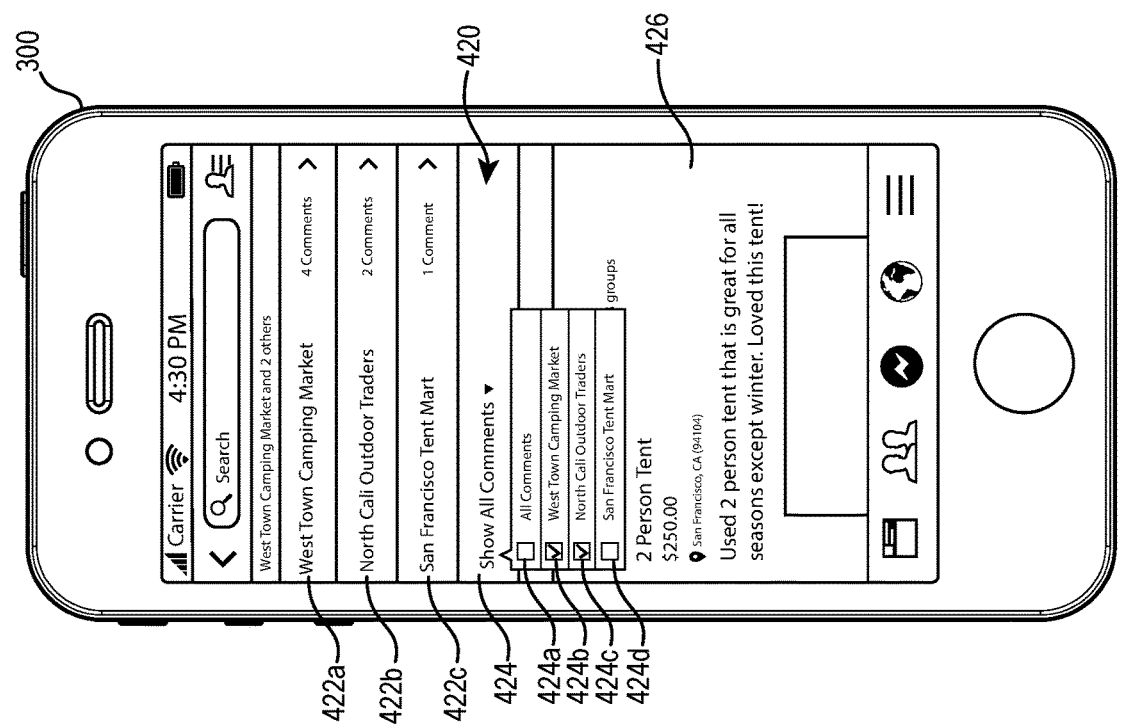

As shown in FIG. 4D, the digital multi-group messaging system 100 can also respond to comments from a plurality of social networking groups utilizing the user interface 420. For example, FIG. 4D illustrates a comment 430 in the digital message comment and display area 426. The comment 430 includes selectable options to generate a reply comment (i.e., "Reply"), generate a message to the user that created the comment 430 (i.e., "Message"), or generate a reaction to the comment (i.e., "Like"). As shown, the digital multi-group messaging system 100 can include similar selectable options in relation to each comment in the digital message and comment display area 426. In this manner, the digital multi-group messaging system 100 can allow users to respond to member interest information from a plurality of social networking groups from a single user interface.

As mentioned previously, the digital multi-group messaging system 100 can also allow a user to further manage a digital message across multiple social networking groups by modifying a digital message or posting a digital message to additional social networking groups. Indeed, the digital multi-group messaging system 100 can allow a user to edit a post, mark a post as sold, or delete a post across a plurality of social networking groups from a single user interface. Furthermore, the digital multi-group messaging system 100 can allow users to add a digital message to additional social networking groups (e.g., based on member interest information presented via the user interface 410 or the user interface 420).

Figure 4E:
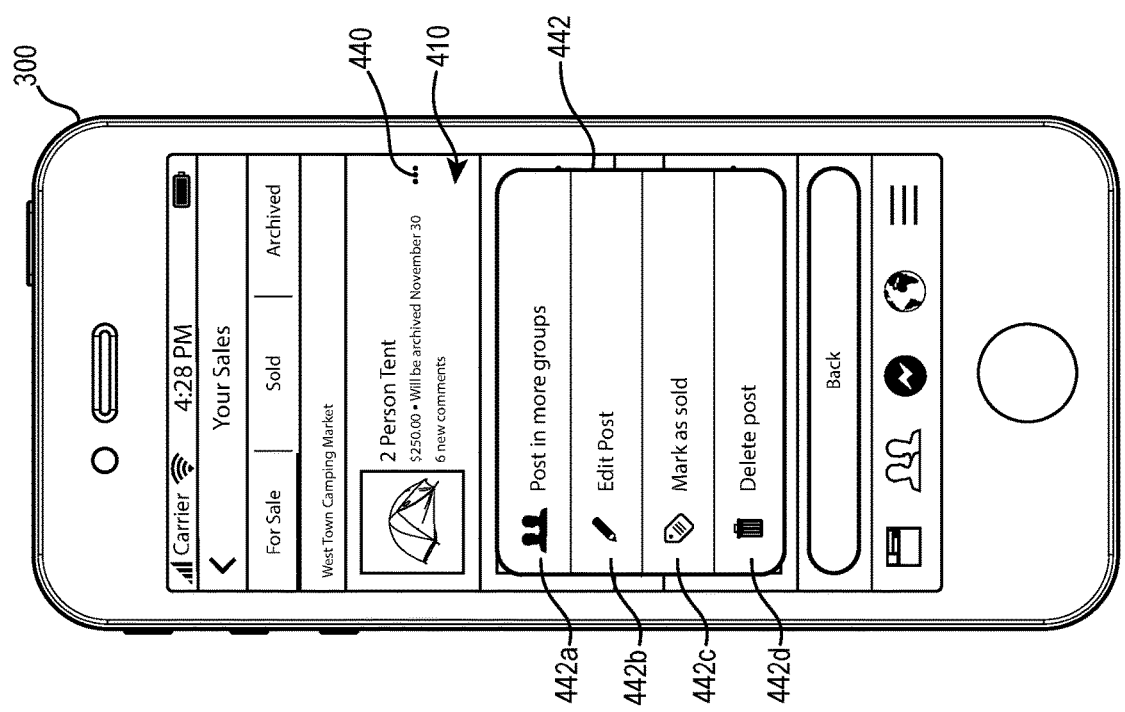

For example, FIG. 4E illustrates the computing device 300 displaying the user interface 410 with an additional options element 440. Upon user interaction with the additional options element 440, the digital multi-group messaging system 100 provides a modification field 442 for display via the user interface 410, which includes modification elements 442a-442d. Specifically, the modification field 442 includes an additional social networking group suggestion element 442a, an edit post element 442b, a mark as sold element 442c, and a delete post 442d.

Based on user interaction with the modification elements 442b-442d the digital multi-group messaging system 100 can modify a digital message posted across a plurality of social networking groups. For example, upon user interaction with the edit post element 442b, the digital multi-group messaging system 100 can receive modifications to digital message content (e.g., a change to a digital image, digital video, or digital text). Moreover, the digital multi-group messaging system 100 can automatically post the modified digital message to a plurality of social networking groups (e.g., the "West Town Camping Market" social networking group, the "North Cali Outdoor Traders" social networking group, and the "San Francisco Tent Mart" social networking group).

Similarly, upon user interaction with the mark as sold element 442*c*, the digital multi-group messaging system 100 can automatically modify the digital message 326 posted in a plurality of social networking groups to indicate that the product identified in the digital message 326 is no longer for sale. In addition, based on user interaction with the delete post element 442*c*, the digital multi-group messaging system 100 can automatically delete posts across a plurality of social networking groups corresponding to the digital message 326. In this manner, the digital multi-group messaging system 100 can allow a user to modify a digital message across multiple social networking groups, without requiring the user to navigate to multiple social networking group pages or multiple posts. Furthermore, the digital multi-group messaging system 100 can modify multiple posts in multiple social networking groups without requiring a user to provide repeated modifications for each post.

Moreover, based on user interaction with the social networking group suggestion element 442*a*, the digital multi-group messaging system 100 can also suggest additional social networking groups to which to post a digital message. For example, the digital multi-group messaging system 100 can apply the ranking algorithm 240 based on updated information to provide more pertinent suggested social networking groups.

To illustrate, upon user interaction with the social networking group suggestion element 442*a*, the digital multi-group messaging system 100 can suggest additional social networking groups based on performance of a digital message in social networking groups. Indeed, at the outset (i.e., before posting a digital message to multiple groups), the digital multi-group messaging system 100 has no information regarding how a digital message has actually performed in a social networking group. For example, before posting a digital message, the digital multi-group messaging system 100 has no member interest information regarding the digital message (e.g., information regarding the types of members or groups that like, comment, or otherwise interact with the digital message).

Accordingly, in response to the social networking group suggestion element 442*a*, the digital multi-group messaging system 100 can analyze information regarding how the digital message 326 has performed in social networking groups and suggest additional social networking groups based on the information. For example, the digital multi-group messaging system 100 determines that the digital message 326 received four comments from the "West Town Camping Market" social networking group but only one comment from the "San Francisco Tent Mart" social networking group. Accordingly, the digital multi-group messaging system 100 can recommend additional social networking groups similar to the "West Town Camping Market" social networking group.

Similarly, the digital multi-group messaging system 100 can analyze the member information for each member that commented on the digital message 326 across social networking groups and suggest additional social networking groups that include similar members. For example, the digital multi-group messaging system 100 can determine that members that commented on the digital message 326 are single males between the age of 25 to 35 that have posted digital messages regarding camping. The digital multi-group messaging system 100 can identify additional social networking groups with similar members (i.e., social networking groups with a threshold number or percentage of members that match this particular profile).

Furthermore, the digital multi-group messaging system 100 can analyze members that overlap social networking groups. For example, the digital multi-group messaging system 100 can determine that the "West Town Camping Market" social networking group and the "North Cali Outdoor traders" social networking group (i.e., the two groups with the most comments) have a threshold number (or percentage) of members that also belong to a third social networking group. Specifically, the digital multi-group messaging system 100 can determine that more than a threshold number of ten members of the "West Town Camping Market" and more than a threshold number of ten members of the "North Cali Outdoor traders" social networking group are members of a third social networking group. In response, the digital multi-group messaging system 100 can suggest the third social networking group.

In addition to the foregoing examples, the digital multi-group messaging system 100 can also consider any updated information in suggesting a social networking group (e.g., any updated factors discussed in relation to FIG. 2). In this manner, the digital multi-group messaging system 100 can provide more pertinent suggestions to a user as additional information becomes available.

Although FIGS. 4B-4D illustrate a particular type of member interest information (i.e., comments) corresponding to a particular type of digital message (i.e., a for sale message), the digital multi-group messaging system 100 can provide any type or variety of member interest information in relation to any type or variety of digital message. Indeed, in one or more embodiments, the digital multi-group messaging system 100 provides the number of views, the number of positive reactions (e.g., "likes"), or some other member interest information in relation to a digital message directed to events or some other subject.

As mentioned previously, in one or more embodiments, the digital multi-group messaging system 100 manages social networking groups with different privacy settings. For example, the digital multi-group messaging system 100 can manage private social networking groups that require a user to be a member to post on a social networking group page (or otherwise send digital messages to the social networking group). Similarly, the digital multi-group messaging system 100 can manage private social networking groups that require a user to obtain permission from an administrator before posting joining the group and posting on the social networking group page.

In one or more embodiments, the digital multi-group messaging system 100 suggests posting a digital message to private social networking groups (even where the user is not a member of the social networking group). Moreover, the digital multi-group messaging system 100 can allow the user to post in the private social networking group. Specifically, in one or more embodiments, the digital multi-group messaging system 100 utilizes a post filter to manage and post digital messages from non-members to private social networking groups.

Figure 5:
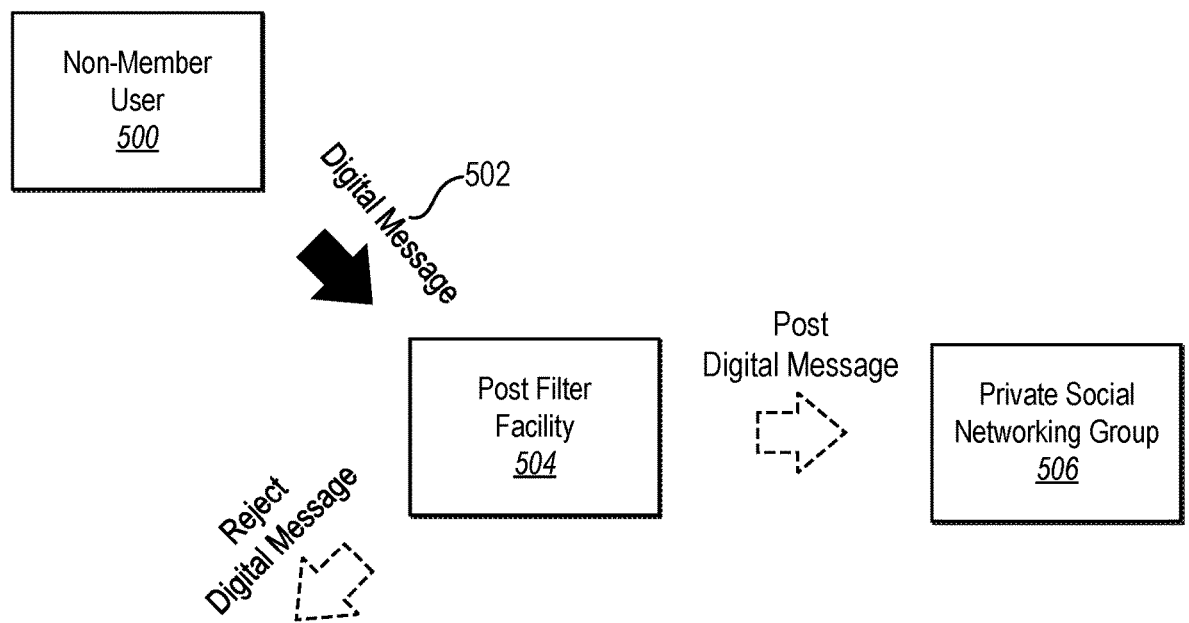
FIG. 5 illustrates applying a post filter corresponding to a private social networking group in accordance with one or more embodiments.

For example, FIG. 5 illustrates applying a post filter in accordance with one or more embodiments. In particular, FIG. 5 illustrates a non-member user 500 that seeks to post a digital message 502 to a private social networking group 506. As shown in FIG. 5, the digital multi-group messaging system 100 can send the digital message 502 to a post filter facility 504, which can determine whether to post the digital message to the private social networking group 506 or reject the digital message.

The post filter facility 504 can filter the digital message 502 in a variety of ways. For example, in one or more embodiments, the digital multi-group messaging system 100 filters the digital message 502 by ensuring that the non-member 500 joins the private social networking group 506 before posting the digital message 502. For example, in one or more embodiments, the digital multi-group messaging system 100 treats a request to post the digital message 502 as a request to join the private social networking group 506 and automatically adds the non-member user 500 as a member of the private social networking group 506. Upon adding the non-member user 500 as a member the digital multi-group messaging system 100 posts the digital message 502 to the private social networking group 506.

It will be appreciated that the non-member user 500 may not wish to become a member of the private social networking group 506. Accordingly, in one or more embodiments, the digital multi-group messaging system 100 can allow the non-member user 500 to become a limited purpose member of the private social networking group 506. Specifically, the digital multi-group messaging system 100 can allow the non-member user 500 to join the private social networking group for a limited period of time (e.g., while the digital message 502 is posted to the private social networking group). After the limited period of time, the digital multi-group messaging system 100 can remove the non-member user 500 as a member of the private social networking group 506.

Similarly, the digital multi-group messaging system 100 can add the non-member user 500 as a limited-purpose member that has limited privileges. For example, the digital multi-group messaging system 100 can add the non-member user 500 as a limited-purpose member that can post the digital message 502 and respond to comments regarding the digital message 502, but cannot otherwise post or comment in the social networking group.

Furthermore, in one or more embodiments, the digital multi-group messaging system 100 generates a section of a social networking group page to non-member posts. For example, the digital multi-group messaging system 100 can generate a section of a social networking group page to for-sale posts by non-members. Moreover, the digital multi-group messaging system 100 can allow members of the social networking group to hide or show the section of posts by non-members. In this manner, the digital multi-group messaging system 100 can allow members of the social networking group to control content on the social networking group page, while also allowing members to receive digital messages from non-members pertinent to a common interest of the social networking group.

As mentioned above, some privacy settings of private social networking groups require approval of an administrator to allow a user to join as a member. In relation to private social networking groups that require administrator approval, the digital multi-group messaging system 100 can automatically send a request to the administrator in response to receiving the digital message 502. For example, the digital multi-group messaging system 100 can automatically send a request to an administrator to allow the non-member user 500 to join as a member (or as a limited purpose member). Upon receiving approval from the administrator, the digital multi-group messaging system 100 can then post the digital message 502 to the private social networking group 506.

In many situations, the non-member user 500 may not wish to await administrator approval prior to posting the digital message 502 to the private social networking group 506. For example, the non-member user 500 may have a time-sensitive digital message regarding an event or a product (e.g., a sale post for tickets to a sporting event on the same day). In one or more embodiments, the digital multi-group messaging system 100 posts the digital message 502 to the private social networking group 506 prior to receiving administrator approval.

For example, in one or more embodiments, the digital multi-group messaging system 100 (e.g., via the post filter facility 504) generates a reliability score corresponding to the non-member user 500 and determines whether to post the digital message based on the reliability score. The digital multi-group messaging system 100 can calculate a reliability score based on a variety of factors, such as user information or digital message content.

To illustrate, in one or more embodiments, the digital multi-group messaging system 100 looks to user information regarding the non-member user 500 to calculate a reliability score. For example, the digital multi-group messaging system 100 can consider a number of social networking groups posts by the non-member user 500 in calculating a reliability score. In addition, the digital multi-group messaging system 100 can calculate a reliability score based on the number of complaints or reports corresponding to the non-member user 500, the number of products posted and/or sold by the non-member user, or the amount of time the non-member user 500 has utilized the digital multi-group messaging system 100 (and/or a social networking system).

In addition, the digital multi-group messaging system 100 can also calculate a reliability score based on digital message content. For example, the digital multi-group messaging system 100 can analyze digital message content of the digital message 502 and generate a reliability score based on a correspondence to content pertinent to the social networking group. To illustrate, the digital multi-group messaging system 100 can analyze digital message content to determine whether the digital message 502 is relevant to the social networking group (e.g., a digital message regarding football tickets may be relevant to a football social networking group but would not be relevant to a ballet social networking group). Similarly, the digital multi-group messaging system 100 can analyze the digital message 502 and calculate a reliability score based on the presence of inappropriate content, such as vulgar language or lewd digital images.

Based on the reliability score, the digital multi-group messaging system 100 can post the digital message 502, reject the digital message 502, seek permission from an administrator, and/or determine a timing for posting the digital message 502. For example, in one or more embodiments, the digital multi-group messaging system 100 applies one or more thresholds to the reliability score in determining whether to post the digital message 502 (i.e., a reliability score below a threshold results in rejecting the digital message).

In one or more embodiments, the digital multi-group messaging system 100 utilizes the reliability score to determine whether to seek approval from an administrator of the private social networking group 506. For example, if the digital multi-group messaging system 100 determines that a reliability score exceeds a particular threshold, the digital multi-group messaging system 100 can automatically post the digital message 502, whereas if the reliability score falls below the particular threshold, the digital multi-group messaging system 100 awaits approval from an administrator prior to posting the digital message 502.

Similarly, in one or more embodiments, if a reliability score exceeds a threshold, the digital multi-group messaging system 100 will send an after-the-fact request for approval to an administrator. In particular, the digital multi-group messaging system 100 can post the digital message 502 and send request for approval from an administrator of the private social networking group 506. More specifically, the digital multi-group messaging system 100 can post the digital message 502, send a request for approval from an administrator of the private social networking group 506, and then, if the administrator rejects the request, remove the post from the private social networking group 506. In such embodiments, the digital multi-group messaging system 100 can allow a (trusted) user to post immediately, while also allowing administrators to maintain control over a private social networking group.

In one or more embodiments, if a reliability score exceeds a certain threshold, the digital multi-group messaging system 100 can send a request for streamlined administrator approval. For example, the digital multi-group messaging system 100 can send a high-priority e-mail, a pop-up notification to an administrator device, or a simultaneous request to a plurality of administrators to increase the speed of posting (or rejecting) the digital message 502.

Figure 6:
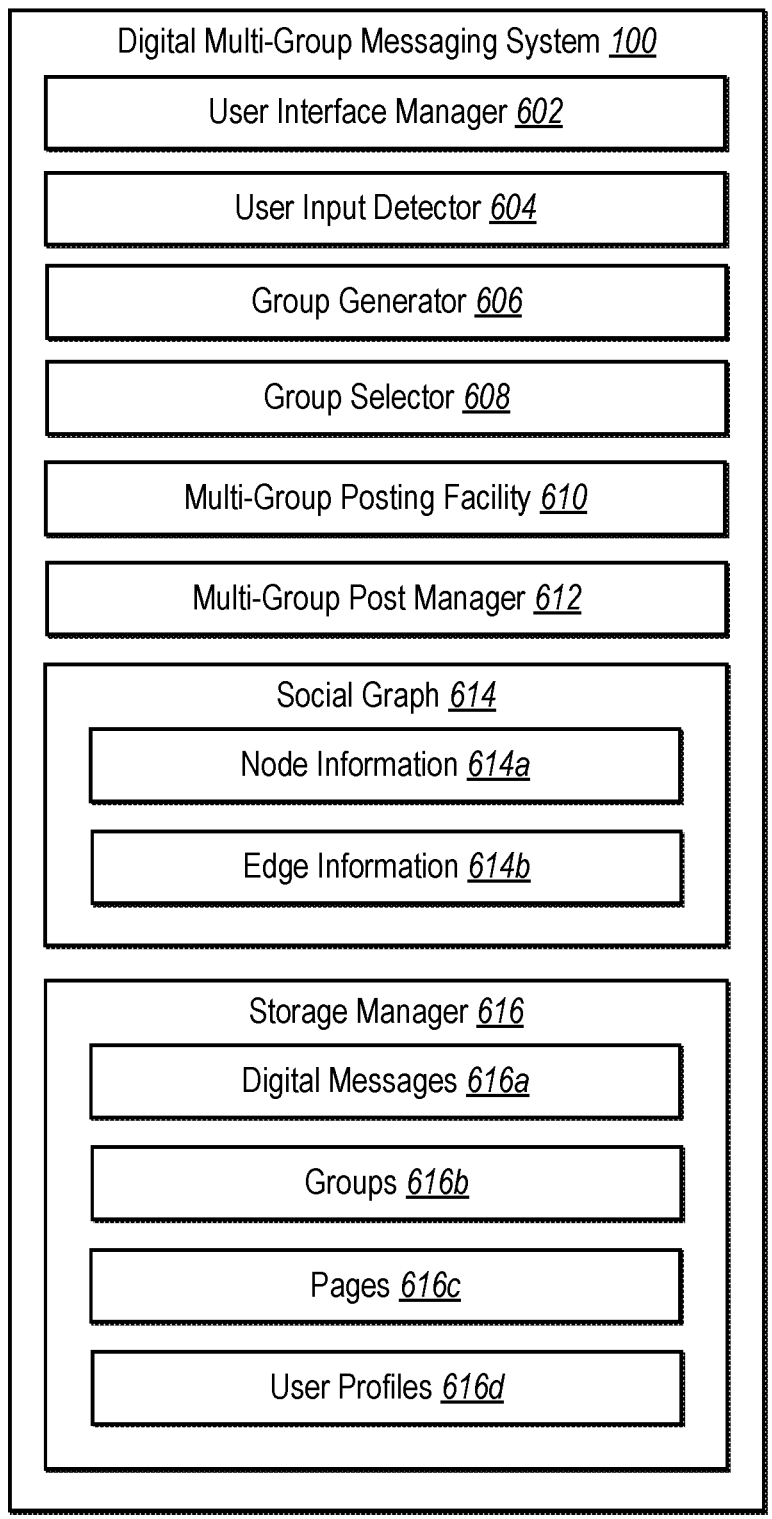
FIG. 6 illustrates a schematic diagram of a digital multi-group messaging system in accordance with one or more embodiments.

Turning now to FIG. 6, additional detail will be provided regarding various components and capabilities of the digital multi-group messaging system 100. In particular, FIG. 6 illustrates an example embodiment of the digital multi-group messaging system 100 in accordance with one or more embodiments. As shown, the digital multi-group messaging system 100 may include, but is not limited to a user interface manager 602; a user input detector 604; a group generator 606; a group selector 608; a multi-group posting facility 610; a multi-group post manager 612; a social graph 614 (comprising node information 614a and edge information 614b); and a storage manager 616 (comprising digital messages 616a, groups 616b, pages 616c, and user profiles 616d).

As just mentioned, and as illustrated in FIG. 6, the digital multi-group messaging system 100 includes the user interface manager 602. The user interface manager 602 can provide, manage, and/or control a graphical user interface (or simply "user interface") for use with the digital multi-group messaging system 100 (e.g., the user interfaces 304, 320, 330, 352, 410, and 420). In particular, the user interface manager 602 may facilitate presentation of information by way of an external component of a client device. For example, the user interface manager 602 may display a user interface by way of a display screen associated with the client device. The user interface may be composed of a plurality of graphical components, objects, and/or elements that allow a user to perform a function. The user interface manager 602 can present, via the client device, a variety of types of information, including text, images, video, audio, characters, or other information. Moreover, the user interface manager 602 can provide a variety of user interfaces specific to any variety of functions, programs, applications, plug-ins, devices, operating systems, and/or components of the client device. Additional details with respect to various example user interface elements are described throughout with regard to various embodiments containing user interfaces.

In addition to the user interface manager 602, as shown in FIG. 6, the digital multi-group messaging system 100 also includes the user input detector 604. The user input detector 604 can detect, identify, monitor, receive, process, capture, and/or record various types of user input. For example, the user input detector 604 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 604 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 604 can detect and identify various types of user interactions with user input devices, such as select events, drag events, scroll events, and so forth. The user input detector 604 can also detect a user interaction with respect to a variety of user interface elements.

In addition, as illustrated in FIG. 6, the digital multi-group messaging system 100 also includes the group generator 606. The group generator 606 can create, manage, and/or generate one or more groups. In particular, the group generator 606 can generate a social networking group comprising a plurality of members. Moreover, the group generator 606 can also generate a social networking group page corresponding to a social networking group. For example, the group generator 606 can detect user interaction by one or more users of a social networking system indicating a desire to join a social networking group, the group generator 606 can add users to a list of group members, generate a social networking group page, and control privileges corresponding to the social networking group page (e.g., limit privileges to members of the social networking group).

Furthermore, as illustrated in FIG. 6, the digital multi-group messaging system 100 also includes the group selector 608. The group selector 608 can identify, rank, select, and/or choose a group to suggest to a user. In particular, the group selector 608 can select a set of social networking groups from a plurality of social networking groups managed by the digital multi-group messaging system 100 (e.g., managed by the group generator 606). For example, as discussed above, the group selector 608 can apply a ranking algorithm to rank and select a set of social networking groups to suggest to a user.

Moreover, as shown in FIG. 6, the digital multi-group messaging system 100 also includes the multi-group posting facility 610. The multi-group posting facility 610 can generate, provide, and/or post digital messages to multiple groups. In particular, the multi-group posting facility 610 can generate a digital message and post the digital message to multiple social networking groups (e.g., social networking group pages generated by the group generator 606). As mentioned above, the multi-group posting facility 610 can also determine whether or when to post a digital message to a private social networking system (e.g., via the post filter facility 504).

In addition, as shown in FIG. 6, the digital multi-group messaging system 100 also includes the multi-group post manager 612. The multi-group post manager 612 can monitor, gather, display, and manage information from multiple groups. In particular, the multi-group post manager 612 can monitor user interactions with digital messages posted to multiple social networking groups. Moreover, the multi-group post manager 612 can generate member interest information corresponding to multiple social networking groups and provide the member interest information via a user interface (e.g., via a single display area of the user interface). Further, the multi-group post manager 612 can also modify digital messages across multiple groups (and post the modified message via the multi-group posting facility 610), respond to comments from multiple groups, or message members of multiple groups.

As further illustrated in FIG. 6, in the case of the digital multi-group messaging system 100 comprising a social networking system, the digital multi-group messaging system 100 may include a social graph 614 for representing and analyzing a plurality of users and concepts. As shown in FIG. 6, the social graph 614 can include node information 614a that stores information comprising nodes for users, nodes for concepts, and/or nodes for items. In addition, the social graph 614 can include edge information 614b comprising relationships between nodes and/or actions occurring within the social-networking system. Further detail regarding social-networking systems, social graphs, edges, and nodes is presented below.

The digital multi-group messaging system 100 can utilize the social graph 614 to suggest social networking groups and manage digital messages across social networking groups. For example, the digital multi-group messaging system 100 can utilize the social graph 614 to select (e.g., via the group selector 608) social networking groups to suggest to a user, generate a reliability score (e.g., via the multi-group posting facility 610 and the post filter facility 504), or determine user information.

As shown in FIG. 6, the digital multi-group messaging system 100 may also contain a storage manager 616. The storage manager 616 maintains data for the digital multi-group messaging system 100. The storage manager 616 can maintain data of any type, size, or kind, as necessary to perform the functions of the digital multi-group messaging system 100. As shown, the storage manager 616 includes digital messages 616a; groups 616b (e.g., social networking groups); pages 616c (e.g., social networking group pages); and user profiles 616d (e.g., user profiles corresponding to users of a social networking system and/or members of a social networking group).

Each of the components 602-616 of the digital multi-group messaging system 100 and their corresponding elements may be in communication with one another using any suitable communication technologies. It will be recognized that although components 602-616 and their corresponding elements are shown to be separate in FIG. 6, any of components 602-616 and their corresponding elements may be combined into fewer components, such as into a single facility or module, divided into more components, or configured into different components as may serve a particular embodiment.

The components 602-616 and their corresponding elements can comprise software, hardware, or both. For example, the components 602-616 and their corresponding elements can comprise one or more instructions stored on a computer-readable storage medium and executable by processors of one or more computing devices. The components 602-616 and their corresponding elements can comprise hardware, such as a special purpose processing device to perform a certain function or group of functions. Additionally, or alternatively, the components 602-616 and their corresponding elements can comprise a combination of computer-executable instructions and hardware.

Furthermore, the components 602-616 of the digital multi-group messaging system 100 may, for example, be implemented as one or more stand-alone applications, as one or more modules of an application, as one or more plug-ins, as one or more library functions or functions that may be called by other applications, and/or as a cloud-computing model. Thus, the components 602-616 of the digital multi-group messaging system 100 may be implemented as a stand-alone application, such as a desktop or mobile application. Furthermore, the components 602-616 of the digital multi-group messaging system 100 may be implemented as one or more web-based applications hosted on a remote server. Alternatively, or additionally, the components of the digital multi-group messaging system 100 may be implemented in a suit of mobile device applications or "apps."

Figure 7:
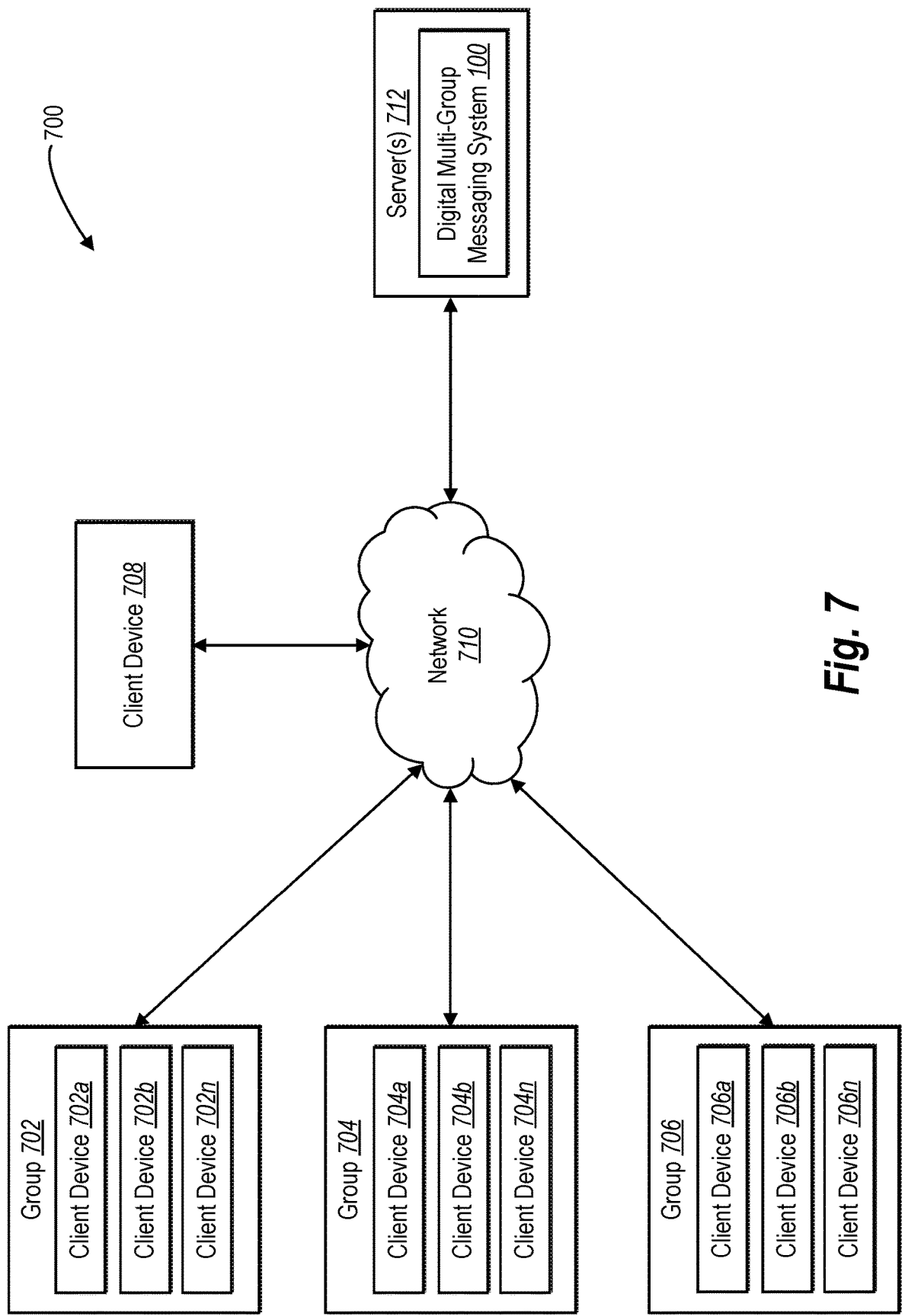
FIG. 7 illustrates a schematic diagram of a network environment in which the methods and systems disclosed herein may be implemented in accordance with one or more embodiments.

Turning now to FIG. 7, further information will be provided regarding implementation of the digital multi-group messaging system 100. Specifically, FIG. 7 illustrates a schematic diagram of one embodiment of an exemplary system environment ("environment") 700 in which the digital multi-group messaging system 100 can operate. As illustrated in FIG. 7, the environment 700 can include groups 702-706 (comprising client devices 702a-702, 704a-704n, 706a-706n, respectively), a client device 708, a network 710, and server(s) 712. The client devices 702a-702n, 704a-704n, 706a-706n, the client device 708, the network 710, and the server(s) 712 may be communicatively coupled with each other either directly or indirectly (e.g., through the network 710). The client devices 702a-702n, 704a-704n, 706a-706n, the client device 708, the network 710, and the server(s) 712 may communicate using any communication platforms and technologies suitable for transporting data and/or communication signals, including any known communication technologies, devices, media, and protocols supportive of remote data communications, examples of which will be described in more detail below.

As just mentioned, and as illustrated in FIG. 7, the environment 700 can include the client devices client devices 702a-702n, 704a-704n, 706a-706n (e.g., the first group client device(s) 106 and/or the second group client device(s) 108), and the client device 708 (e.g., the first client device 102 or the computing device 300). The client devices 702a-702n, 704a-704n, 706a-706n, and the client device 708 may comprise any type of computing device. For example, the client devices 702a-702n, 704a-704n, 706a-706n, and the client device 708 may comprise one or more personal computers, laptop computers, mobile devices, mobile phones, tablets, special purpose computers, TVs, or other computing devices. In one or more embodiments, the client devices 702a-702n, 704a-704n, 706a-706n, and the client device 708 may comprise computing devices capable of communicating with each other or the server(s) 712. The client devices 702a-702n, 704a-704n, 706a-706n, and the client device 708 may comprise one or more computing devices as discussed in greater detail below in relation to FIG. 9.

As shown in FIG. 7, the environment 700 may also include the groups 702-706. In particular, the groups 702-706 can comprise an organization of the client devices 702a-702n, 704a-704n, 706a-706n. Specifically, the groups 702-706 can comprise an organization of the client devices 702a-702n, 704a-704n, 706a-706n based on whether users of the client devices 702a-702n, 704a-704n, 706a-706n have joined the corresponding groups 702-706. It will be appreciated that although FIG. 7 illustrates unique client devices corresponding to each group, a user of the same client device can belong to multiple groups. Thus, for example, a user of the client device 702a can belong to both the group 702 and the group 704.

As illustrated in FIG. 7, the client devices 702a-702n, 704a-704n, 706a-706n, the client device 708, and/or the server(s) 712 may communicate via the network 710. The network 710 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 710 may be any suitable network over which the client devices 702a-702n, 704a-704n, 706a-706n, and the client device 708 may access the server(s) 712 or vice versa. The network 710 will be discussed in more detail below in relation to FIG. 9.

Moreover, as illustrated in FIG. 7, the environment 700 also includes the server(s) 712. The server(s) 712 may generate, store, receive, and/or transmit any type of data, including digital messages 616a, groups 616b, pages 616c, and user profiles 616d. For example, the server(s) 712 may receive data from the client device 702a and send the data to the client device 702b. In one example, the server(s) 712 can host a social networking system. In one or more embodiments, the server(s) 712 may comprise a data server. The server(s) 712 can also comprise a communication server or a web-hosting server. Regardless, the server(s) 712 can be configured to receive a wide range of electronic documents or communications. Additional details regarding the server(s) 712 will be discussed below in relation to FIG. 9.

Although FIG. 7 illustrates a particular number of client devices, it will be appreciated that the environment 700 can include any number of computing devices (fewer or greater than shown). Similarly, although FIG. 7 illustrates a particular arrangement of the client devices 702a-702n, 704a-704n, 706a-706n, the client device 708, the network 710, and the server(s) 712, various additional arrangements are possible.

By way of example, in one or more embodiments the client devices 702a-702, 704a-704n, 706a-706n send a request to the server(s) 712 to join the groups 702, 704, and 706, respectively. In response, the server(s) 712 (e.g., via the group generator 606) can generate and manage the groups 702, 704, and 706 (e.g., generate group pages corresponding to the groups 702, 704, 706). Moreover, the server(s) 712 can also receive an indication of a draft digital message from the client device 708 (e.g., via the multi-group posting facility 610). In response, the server(s) 712 can analyze the groups 702, 704, and 706 and provide a set of suggested groups to the client device 708 to which to post the digital message (e.g., via the group selector 608). The client device 708 can provide to the server(s) 712 a user selection of the groups 702, 704 from the set of suggested groups. Moreover, the server(s) 712 can post the digital message to the groups 702, 704 (e.g., via the multi-group posting facility 610). Furthermore, the server(s) 712 can monitor user interaction via the client devices 702a-702, 704a-704n with the digital message posted to the groups 702, 704 (e.g., via the multi-group post manager 612). Based on the monitored user interaction, the server(s) 712 can generate member interest information and provide the member interest information to the client device 708 (e.g., via the multi-group post manager 612). Further, the client device 708 can provide modifications to the digital message to the server(s) 712 and the server(s) 712 can provide the modified digital message to the groups 702, 704.

As illustrated by the previous example embodiments, the digital multi-group messaging system 100 may be implemented in whole, or in part, by the individual elements 702-712 of the environment 700. Although FIG. 7 illustrates the digital multi-group messaging system 100 implemented with regard to the server(s) 712, it will be appreciated that components of the digital multi-group messaging system 100 can be implemented in any of the components of the environment 700. For example, in one or more embodiments, the user interface manager 602, the user input detector 604, and the group selector 608 are implemented on the client device 708.

Figure 8:
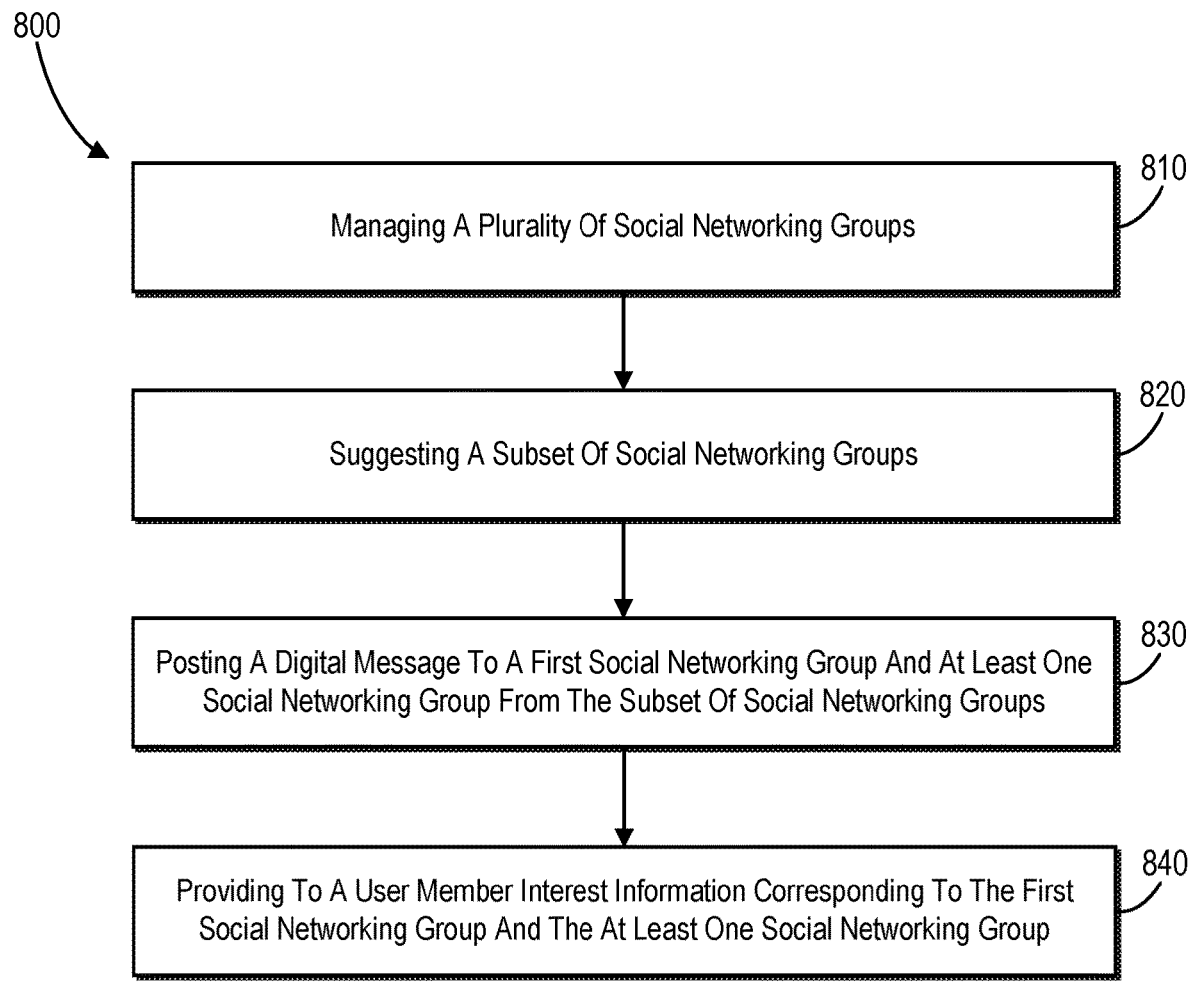
FIG. 8 illustrates a flow chart of a method of managing a digital message across a plurality of social messaging groups in accordance with one or more embodiments.

FIGS. 1-7, the corresponding text, and the examples, provide a number of different systems and devices that manage digital messages across a plurality of social networking groups. In addition to the foregoing, embodiments can also be described in terms of flowcharts comprising acts and steps in a method for accomplishing a particular result. For example, FIG. 8 illustrates a flowchart of exemplary methods in accordance with one or more embodiments of the present invention. The methods described in relation to FIG. 8 may be performed with less or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart of a series of acts in a method 800 of managing digital messages across a plurality of social networking groups. In one or more embodiments, the method 800 is performed in a digital medium environment that includes the digital multi-group messaging system 100. The method 800 is intended to be illustrative of one or more methods in accordance with the present disclosure, and is not intended to limit potential embodiments. Alternative embodiments can include additional, fewer, or different steps than those articulated in FIG. 8.

As illustrated in FIG. 8, the method 800 includes an act 810 of managing a plurality of social networking groups. In particular, the act 810 can include managing a plurality of social networking groups via a social networking system, wherein each social networking group of the plurality of social networking groups comprises a plurality of members that are users of the social networking system that have joined the social networking group.

In addition, as shown in FIG. 8, the method 800 also include an act 820 of suggesting a subset of social networking groups. In particular, the act 820 can include, in response to detecting a digital message from a user to a first social networking group, suggesting to the user, by at least one processor and based on the first social networking group, a subset of social networking groups of the plurality of social networking groups to which to post the digital message. For example, in one or more embodiments, the act 820 includes detecting a similarity between the first social networking group and the at least one social networking group; and selecting the at least one social networking group for inclusion within the subset of social networking groups to suggest to the user based on the detected similarity. In addition, in one or more embodiments, the act 820 can include detecting at least one of the following: an activity level of the at least one social networking group or a number of members belonging to the at least one social networking group; and selecting the at least one social networking group for inclusion within the subset of social networking groups to suggest to the user based on at least one of the following: the activity level of the at least one social networking group or the number of members belonging to the at least one social networking group.

Moreover, the act 820 can also include detecting digital message content within the digital message; and selecting the at least one social networking group for inclusion within the subset of social networking groups to suggest to the user based on the detected digital message content. In addition, in one or more embodiments, the digital message content comprises a product for sale by the user, and the act 820 also includes determining a correspondence between the product and the at least one social networking group; and selecting the at least one social networking group for inclusion within the subset of social networking groups to suggest to the user based on the determined correspondence between the product and the at least one social networking group. Moreover, in one or more embodiments, the user is not a member of a social networking group of the suggested subset of social networking groups.

In addition, in one or more embodiments, the act 820 includes, in response to detecting a digital message comprising digital message content from a user, suggesting to the user, by at least one processor and based on the digital message content, a subset of social networking groups of the plurality of social networking groups to which to post the digital message.

As shown in FIG. 8, the method 800 also includes an act 830 of posting the digital message to a first social networking group and at least one social networking group from the subset of social networking groups. In particular, the act 830 can include, based on a selection by the user of at least one social networking group of the suggested subset of social networking groups, posting the digital message to the first social networking group and the at least one social networking group.

Moreover, as illustrated in FIG. 8, the method 800 also includes an act 840 of providing to a user member interest information corresponding to the first social networking group and the at least one social networking group. In particular, the act 840 can include providing to the user within a user interface, by the at least one processor, member interest information corresponding to the digital message from members of the first social networking group together with member interest information corresponding to the digital message from members of the at least one social networking group. For example, in one or more embodiments, the act 840 includes providing, for display to the user via a single display area of the user interface, comments corresponding to the digital message from members of the first social networking group. Moreover, the act 840 can also include providing, for display to the user, comments corresponding to the digital message from members of the at least one social networking group.

In addition, in one or more embodiments, the method 800 further includes providing, for display to the user, a comment filter element comprising a first group filter indicator corresponding to the first social networking group and a second group filter indicator corresponding to the at least one social networking group; and based upon a selection by the user of either the first group filter indicator or the second group filter indicator, modifying the user interface to either provide only the comments corresponding to the digital message from members of the first social networking group or only the comments corresponding to the digital message from the members of the at least one social networking group. Furthermore, in one or more embodiments, the method 800 also includes, after posting the digital message to the first social networking group and the at least one social networking group, receive user input from the user comprising a modification to the digital message content; and automatically update the digital message to reflect the modification within the first social networking group and the at least one social networking group.

Moreover, in one or more embodiments, the digital message comprises digital message content and the method 800 also includes after posting the digital message to the first social networking group and the at least one social networking group, receiving user input from the user comprising a modification to the digital message content; and automatically updating the digital message to reflect the modification within the first social networking group and the at least one social networking group.

Figure 9:
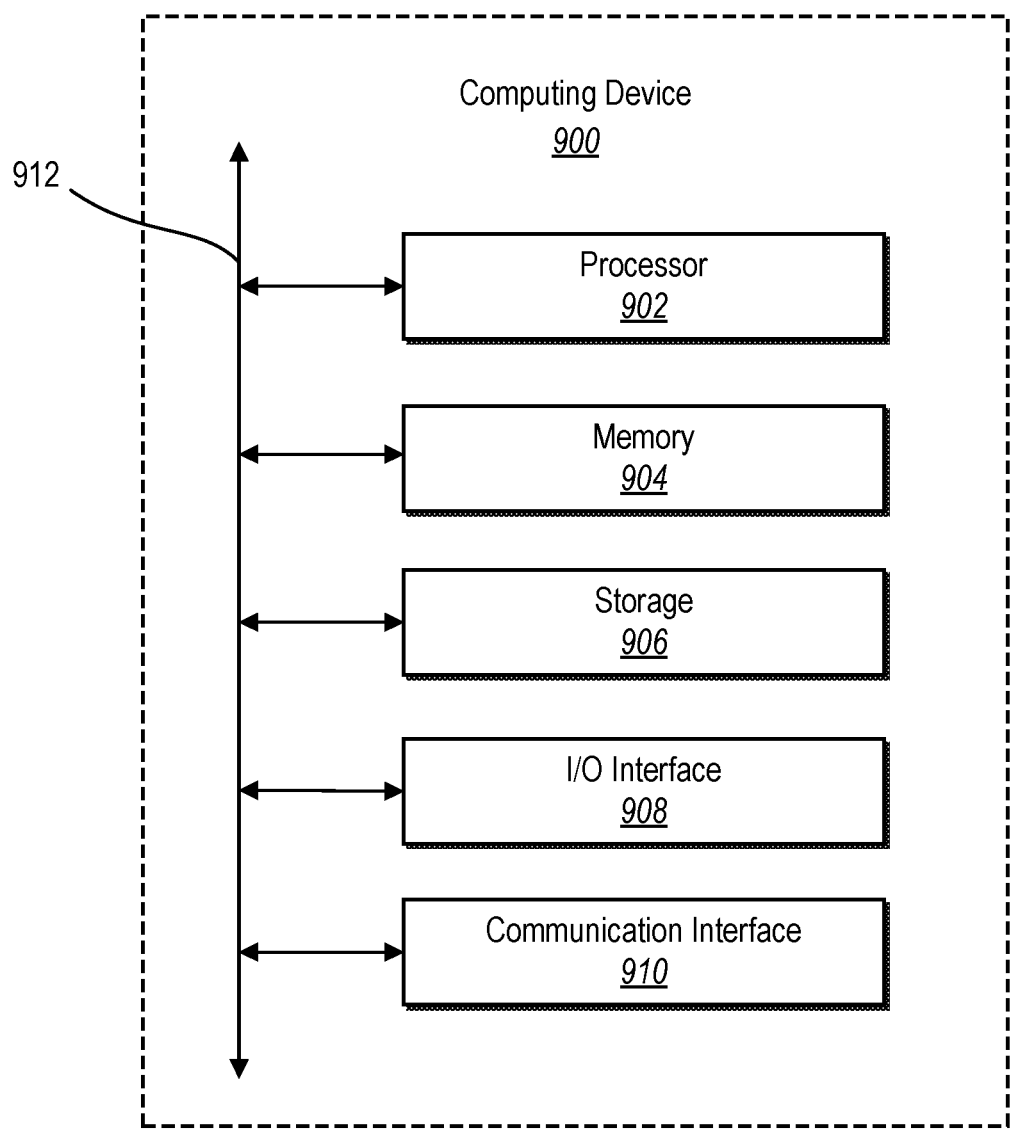
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that the first client device 102, the first group client device(s), the second group client device(s) 106, the computing device 300, the computing device 350, the client devices 702a-702, 704a-704n, 706a-706n, and the server(s) 712, comprise one or more computing devices in accordance with implementations of computing device 1300. As shown by FIG. 9, the computing device can comprise a processor 902, a memory 904, a storage device 906, an I/O interface 908, and a communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, a computing device 900 can include fewer components than those shown in FIG. 9. Components of computing device 900 shown in FIG. 9 will now be described in additional detail.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to the computing device 900. In particular embodiments, storage device 906 is non-volatile, solid-state memory. In other embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the environment 700 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similar to events, the calendar entries may include times, dates, locations and identities of other users.

Figure 10:
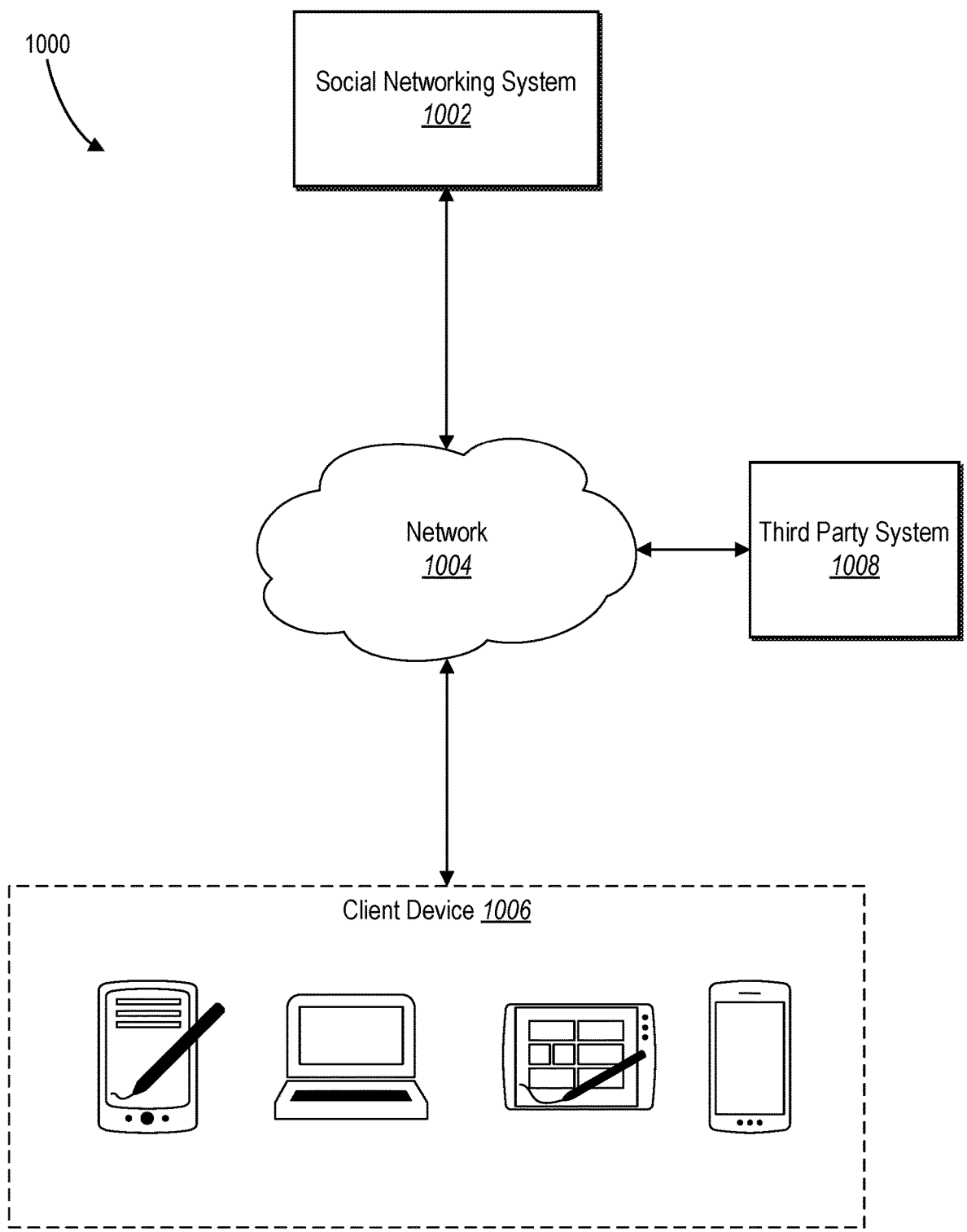
FIG. 10 illustrates a network environment of a social-networking system according one or more embodiments.

FIG. 10 illustrates an example network environment of a social-networking system. In particular embodiments, a social-networking system 1002 may comprise one or more data stores. In particular embodiments, the social-networking system 1002 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1002 may comprise one or more computing devices (e.g., servers) hosting functionality directed to operation of the social-networking system 1002. A user of the social-networking system 1002 may access the social-networking system 1002 using a client device such as client device 1006. In particular embodiments, the client device 1006 can interact with the social-networking system 1002 through a network 1004.

The client device 1006 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access the social-networking system 1002.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 11:
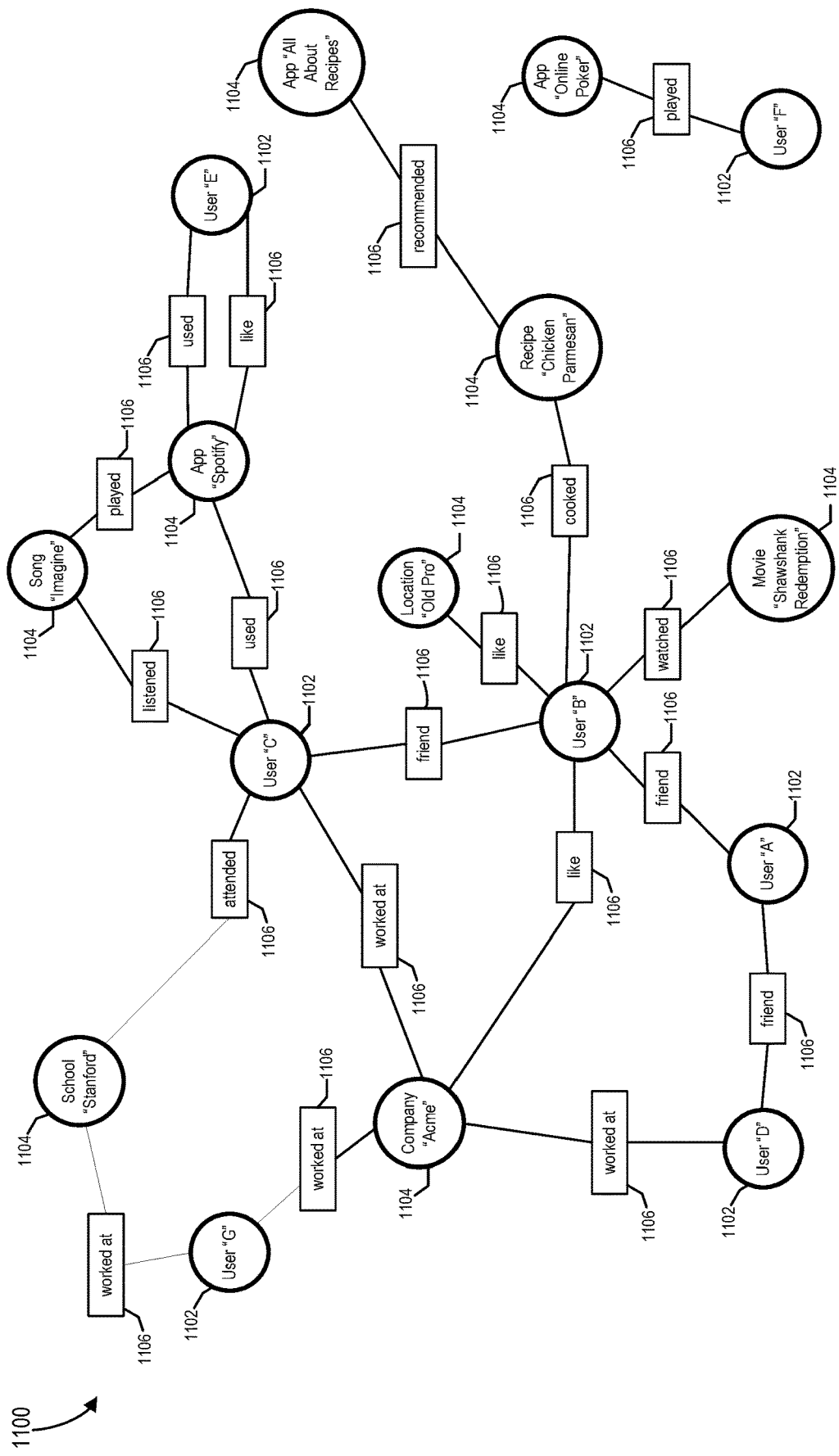
FIG. 11 illustrates an example social graph of a social networking system in accordance with one or more embodiments.

FIG. 11 illustrates example social graph 1100. In particular embodiments, social networking system 1002 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a social networking system 1002, client device 1006, or third-party system 1008 may access social graph 1100 and related social-graph information for suitable applications. The nodes and edges of social graph 1100 may be stored as data objects, for example, in a data store (such as a social-graph database). Such a data store may include one or more searchable or query able indexes of nodes or edges of social graph 1100.

In particular embodiments, a user node 1102 may correspond to a user of social networking system 1002. As an example and not by way of limitation, a user may be an individual (human user), an entity (e.g., an enterprise, business, or third-party application), or a group (e.g., of individuals or entities) that interacts or communicates with or over social networking system 1002. In particular embodiments, when a user registers for an account with social networking system 1002, social networking system 1002 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with social networking system 1002. In particular embodiments, a user node 1102 may be associated with information provided by a user or information gathered by various systems, including social networking system 1002. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1104 may correspond to a concept. As an example and not by way of limitation, a concept may correspond to a place (such as, for example, a movie theater, restaurant, landmark, or city); a website (such as, for example, a website associated with social-network system 1002 or a third-party website associated with a web-application server); an entity (such as, for example, a person, business, group, sports team, or celebrity); a resource (such as, for example, an audio file, video file, digital photo, text file, structured document, or application) which may be located within social networking system 1002 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including social networking system 1002. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to social networking system 1002. Profile pages may also be hosted on third-party websites associated with a third-party server 1008. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1008. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1006 to send to social networking system 1002 a message indicating the user's action. In response to the message, social networking system 1002 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, social networking system 1002 may send a "friend request" to the second user. If the second user confirms the "friend request," social networking system 1002 may create an edge 1106 connecting the first user's user node 1102 to the second user's user node 1102 in social graph 1100 and store edge 1106 as social-graph information in one or more of data stores. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, social networking system 1002 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1002 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, social networking system 1002 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, social networking system 1002 may create an edge 1106 between a user node 1102 and a concept node 1104 in social graph 1100. As an example and not by way of limitation, a user viewing a concept-profile page (such as, for example, by using a web browser or a special-purpose application hosted by the user's client device 1006) may indicate that he or she likes the concept represented by the concept node 1104 by clicking or selecting a "Like" icon, which may cause the user's client device 1006 to send to social networking system 1002 a message indicating the user's liking of the concept associated with the concept-profile page. In response to the message, social networking system 1002 may create an edge 1106 between user node 1102 associated with the user and concept node 1104, as illustrated by "like" edge 1106 between the user and concept node 1104. In particular embodiments, social networking system 1002 may store an edge 1106 in one or more data stores. In particular embodiments, an edge 1106 may be automatically formed by social networking system 1002 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1002). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1002 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1002) or RSVP (e.g., through social networking system 1002) to an event associated with the advertisement. In addition or as an alternative, an advertisement may include social-networking-system context directed to the user. As an example and not by way of limitation, an advertisement may display information about a friend of the user within social networking system 1002 who has taken an action associated with the subject matter of the advertisement.

In particular embodiments, social networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1002 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1002 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1002 may calculate a coefficient based on a user's actions. Social networking system 1002 may monitor such actions on the online social network, on a third-party system 1008, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1002 may calculate a coefficient based on the user's actions with particular types of content. The content may be associated with the online social network, a third-party system 1008, or another suitable system. The content may include users, profile pages, posts, news stories, headlines, instant messages, chat room conversations, emails, advertisements, pictures, video, music, other suitable objects, or any combination thereof. Social networking system 1002 may analyze a user's actions to determine whether one or more of the actions indicate an affinity for subject matter, content, other users, and so forth. As an example and not by way of limitation, if a user may make frequently posts content related to "coffee" or variants thereof, social networking system 1002 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1002 may calculate a coefficient based on the type of relationship between particular objects. Referencing the social graph 1100, social networking system 1002 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than user nodes 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1002 may determine that the user has a higher coefficient with respect to the first photo than the second photo because having a tagged-in-type relationship with content may be assigned a higher weight and/or rating than having a like-type relationship with content. In particular embodiments, social networking system 1002 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1002 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, social networking system 1002 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1006 of the user). A first user may be more interested in other users or concepts that are closer to the first user. As an example and not by way of limitation, if a user is one mile from an airport and two miles from a gas station, social networking system 1002 may determine that the user has a higher coefficient for the airport than the gas station based on the proximity of the airport to the user.

In particular embodiments, social networking system 1002 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1002 may provide information that is relevant to user's interests and current circumstances, increasing the likelihood that they will find such information of interest. In particular embodiments, social networking system 1002 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1002 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1002 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1008 (e.g., via an API or other communication channel), or from another suitable system. In response to the request, social networking system 1002 may calculate the coefficient (or access the coefficient information if it has previously been calculated and stored). In particular embodiments, social networking system 1002 may measure an affinity with respect to a particular process. Different processes (both internal and external to the online social network) may request a coefficient for a particular object or set of objects. Social networking system 1002 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1104 corresponding to a particular photo may have a privacy setting specifying that the photo may only be accessed by users tagged in the photo and their friends. In particular embodiments, privacy settings may allow users to opt in or opt out of having their actions logged by social networking system 1002 or shared with other systems (e.g., third-party system 1008). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1008, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1002 may send a request to the data store for the object. The request may identify the user associated with the request and may only be sent to the user (or a client system 1006 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    managing a plurality of social networking groups via a social networking system, wherein each social networking group of the plurality of social networking groups comprises a plurality of members that are users of the social networking system that have joined the social networking group;
    in response to detecting a digital message from a client device to a first social networking group, suggesting to the client device, by at least one processor and based on the first social networking group, a subset of social networking groups of the plurality of social networking groups to which to post the digital message in addition to the first social networking group;
    based on a selection by the client device of a second social networking group of the suggested subset of social networking groups, posting the digital message to both of a first group feed of the first social networking group and a second group feed of the second social networking group; and
    providing to the client device within a multi-group post management user interface, by the at least one processor, member interest information comprising a first indication of a first set of comments corresponding to the digital message from members of the first social networking group together with member interest information comprising a second indication of a second set of comments corresponding to the digital message from members of the second social networking group.

2. The computer-implemented method of claim 1, further comprising:
    detecting a similarity between the first social networking group and the second social networking group; and
    selecting the second social networking group for inclusion within the subset of social networking groups to suggest to the client device based on the detected similarity.

3. The computer-implemented method of claim 1, further comprising:
    detecting at least one of the following: an activity level of the second social networking group or a number of members belonging to the second social networking group; and
    selecting the second social networking group for inclusion within the subset of social networking groups to suggest to the client device based on at least one of the following: the activity level of the second social networking group or the number of members belonging to the second social networking group.

4. The computer-implemented method of claim 1, further comprising:
- detecting digital message content within the digital message; and
- selecting the second social networking group for inclusion within the subset of social networking groups to suggest to the client device based on the detected digital message content.

5. The computer-implemented method of claim 4, wherein the digital message content comprises a product for sale by a user of the client device, the method further comprising:
- determining a correspondence between the product and the second social networking group; and
- selecting the second social networking group for inclusion within the subset of social networking groups to suggest to the client device based on the determined correspondence between the product and the second social networking group.

6. The computer-implemented method of claim 1, wherein:
- posting the digital message to both of the first group feed of the first social networking group and the second group feed of the second social networking group comprises posting a first post of the digital message to the first social networking group and a second post of the digital message to the second social networking group; and
- the first set of comments correspond to the first post of the digital message, and the second set of comments correspond to the second post of the digital message.

7. The computer-implemented method of claim 1, wherein:
- providing the member interest information corresponding to the digital message from members of the first social networking group comprises providing, for display to the client device via the multi-group post management user interface, a first indication of a first set of reactions corresponding to the digital message from members of the first social networking group in addition to the first indication of the first set of comments corresponding to the digital message from members of the first social networking group; and
- providing the member interest information corresponding to the digital message from members of the second social networking group comprises providing, for display to the client device via the multi-group post management user interface, a second indication of a second set of reactions corresponding to the digital message from members of the second social networking group in addition to the second indication of the second set of comments corresponding to the digital message from members of the second social networking group.

8. The computer-implemented method of claim 1, further comprising:
- providing, for display to the client device, a comment filter element comprising a first group filter indicator corresponding to the first social networking group and a second group filter indicator corresponding to the second social networking group; and
- based upon a selection by a user of the client device either the first group filter indicator or the second group filter indicator, modifying the multi-group post management user interface to either provide only comments corresponding to the digital message from members of the first social networking group or only comments corresponding to the digital message from the members of the second social networking group.

9. The computer-implemented method of claim 1, wherein the digital message comprises digital message content, the method further comprising:
- after posting the digital message to the first social networking group and the second social networking group, receiving user input from the client device comprising a modification to the digital message content; and
- automatically updating the digital message to reflect the modification within the first social networking group and the second social networking group.

10. A system comprising:
at least one processor; and
at least one non-transitory computer readable storage medium storing instructions that, when executed by the at least one processor, cause the system to:
- manage a plurality of social networking groups via a social networking system, wherein each social networking group of the plurality of social networking groups comprises a plurality of members that are users of the social networking system that have joined the social networking group;
- in response to detecting a digital message from a client device to a first social networking group, suggest to the client device based on the first social networking group, a subset of social networking groups of the plurality of social networking groups to which to post the message in addition to the first social networking group;
- based on a selection by the client device of a second social networking group of the suggested subset of social networking groups, posting the digital message to both of a first group feed of the first social networking group and a second group feed of the second social networking group; and
- provide to the client device, within a multi-group post management user interface, member interest information comprising a first indication of a first set of comments corresponding to the digital message from members of the first social networking group together with member interest information comprising a second indication of a second set of comments corresponding to the digital message from members of the second social networking group.

11. The system of claim 10, further comprising instructions that, when executed by the at least one processor, cause the system to:
- detect a similarity between the first social networking group and the second social networking group; and
- select the second social networking group for inclusion within the subset of social networking groups to suggest to the client device based on the detected similarity.

12. The system of claim 10, further comprising instructions that, when executed by the at least one processor, cause the system to:
- detect at least one of the following: an activity level of the second social networking group or a number of members belonging to the second social networking group; and
- select the second social networking group for inclusion within the subset of social networking groups to suggest to the client device based on at least one of the following: the activity level of the second social networking group or the number of members belonging to the second social networking group.

13. The system of claim 10, further comprising instructions that, when executed by the at least one processor, cause the system to:
- detect digital message content within the digital message; and
- select the second social networking group for inclusion within the subset of social networking groups to suggest to the client device based on the detected digital message content.

14. The system of claim 13, wherein the detected digital message content comprises a product for sale by a user of the client device, the system further comprising instructions that, when executed by the at least one processor, cause the system to:
- determine a correspondence between the product and the second social networking group; and
- select the second social networking group for inclusion within the subset of social networking groups to suggest to the client device based on the determined correspondence between the product and the second social networking group.

15. The system of claim 10, wherein the digital message comprises digital message content, the system further comprising instructions that, when executed by the at least one processor, cause the system to:
- after posting the digital message to the first social networking group and the second social networking group, receive user input via the client device comprising a modification to the digital message content; and
- automatically update the digital message to reflect the modification within the first social networking group and the second social networking group.

16. A method comprising:
- identifying a plurality of social networking groups via a social networking system, wherein each social networking group of the plurality of social networking groups comprises a plurality of members that are users of the social networking system that have joined the social networking group;
- in response to detecting a digital message comprising digital message content from a client device, suggesting to the client device, by at least one processor and based on the digital message content, a subset of social networking groups of the plurality of social networking groups to which to post the digital message in addition to the first social networking group;
- based on a selection by the client device of a first social networking group and a second social networking group of the suggested subset of social networking groups, providing a first post of the digital message to a first group feed of the first social networking group and a second post of the digital message to a second group feed of the second social networking group; and
- provide to the client device within a multi-group post management user interface member interest information comprising a first indication of a first set of comments corresponding to the first post of the digital message from members of the first social networking group together with member interest information comprising a second indication of a second set of comments corresponding to the second post of the digital message from members of the second social networking group.

17. The method of claim 16, wherein the digital message content comprises a product for sale by a user of the client device, the method further comprising:
- determining a correspondence between the product and the second social networking group; and
- selecting the second social networking group for inclusion within the subset of social networking groups to suggest to the client device based on the determined correspondence between the product and the second social networking group.

18. The method of claim 16, further comprising:
- detecting at least one of the following: an activity level of the second social networking group or a number of members belonging to the second social networking group; and
- selecting the second social networking group for inclusion within the subset of social networking groups to suggest to the client device based on at least one of the following: the activity level of the second social networking group or the number of members belonging to the second social networking group.

19. The method of claim 16, wherein:
- providing the member interest information corresponding to the digital message from members of the first social networking group comprises providing, for display to the client device via the multi-group post management user interface, a first indication of a first set of reactions corresponding to the digital message from members of the first social networking group in addition to the first indication of the first set of comments corresponding to the digital message from members of the first social networking group; and
- providing the member interest information corresponding to the digital message from members of the second social networking group comprises providing, for display to the client device via the multi-group post management user interface, a second indication of a second set of reactions corresponding to the digital message from members of the second social networking group in addition to the second indication of the second set of comments corresponding to the digital message from members of the second social networking group.

20. The method of claim 16, further comprising:
- after posting the digital message to the first social networking group and the second social networking group, receiving user input from the client device comprising a modification to the digital message content; and
- automatically update the digital message to reflect the modification within the first social networking group and the second social networking group.

* * * * *